United States Patent
Muto et al.

(10) Patent No.: US 9,019,247 B2
(45) Date of Patent: Apr. 28, 2015

(54) MODIFYING INFORMATION ON A HAND WRITABLE PHYSICAL MEDIUM WITH A DIGITAL PEN

(71) Applicant: International Business Machines Corporation, Armonk, NY (US)

(72) Inventors: Satoshi Muto, Tokyo-to (JP); Satoshi Yokoyama, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 13/683,290

(22) Filed: Nov. 21, 2012

(65) Prior Publication Data

US 2013/0321352 A1    Dec. 5, 2013

(30) Foreign Application Priority Data

Nov. 24, 2011 (JP) ................... 2011-256528

(51) Int. Cl.
*G06F 3/0354* (2013.01)

(52) U.S. Cl.
CPC .................. *G06F 3/03545* (2013.01)

(58) Field of Classification Search
CPC ........................ G06F 3/0354; G06F 3/04883
USPC ............ 345/156–179; 382/186–189; 715/268
See application file for complete search history.

(56) References Cited

U.S. PATENT DOCUMENTS

2006/0210163 A1*   9/2006   Garside et al. ................ 382/186
2007/0286486 A1*  12/2007   Goldstein ..................... 382/187
2014/0019855 A1*   1/2014   Kim et al. ..................... 715/268

FOREIGN PATENT DOCUMENTS

| JP | S61163480 A | 7/1986 |
| JP | 06095800 A | 4/1994 |
| JP | 06119485 A | 4/1994 |
| JP | 07049923 A | 2/1995 |
| JP | 11328310 A | 11/1999 |
| JP | 2001067434 A | 3/2001 |
| JP | 2003335082 | 11/2003 |
| JP | 2004152040 A | 5/2004 |
| JP | 2004206293 A | 7/2004 |
| JP | 2006338677 A | 12/2006 |
| JP | 2009015771 A | 1/2009 |
| JP | 2010067158 A | 3/2010 |

* cited by examiner

*Primary Examiner* — Amare Mengistu
*Assistant Examiner* — Jennifer Zubajlo
(74) *Attorney, Agent, or Firm* — Cantor Colburn LLP; Jeanine Ray-Yartietts

(57) ABSTRACT

One embodiment provides a method for modifying information stored in storage by modifying information on a hand writable physical medium with a digital pen, wherein the hand writable physical medium includes a predetermined field including one or more item field name and one or more first region for information entry associated with the one or more item field name. The information stored in the storage includes attribute values corresponding to each of the one or more item field name of the physical medium, and attribute values corresponding to information entered into each of the one or more first region. The method for modifying includes an apparatus communicable with the digital pen detecting that a modification symbol is added, by using the digital pen, to information which has been entered into any of the one or more first region in the predetermined field.

21 Claims, 37 Drawing Sheets

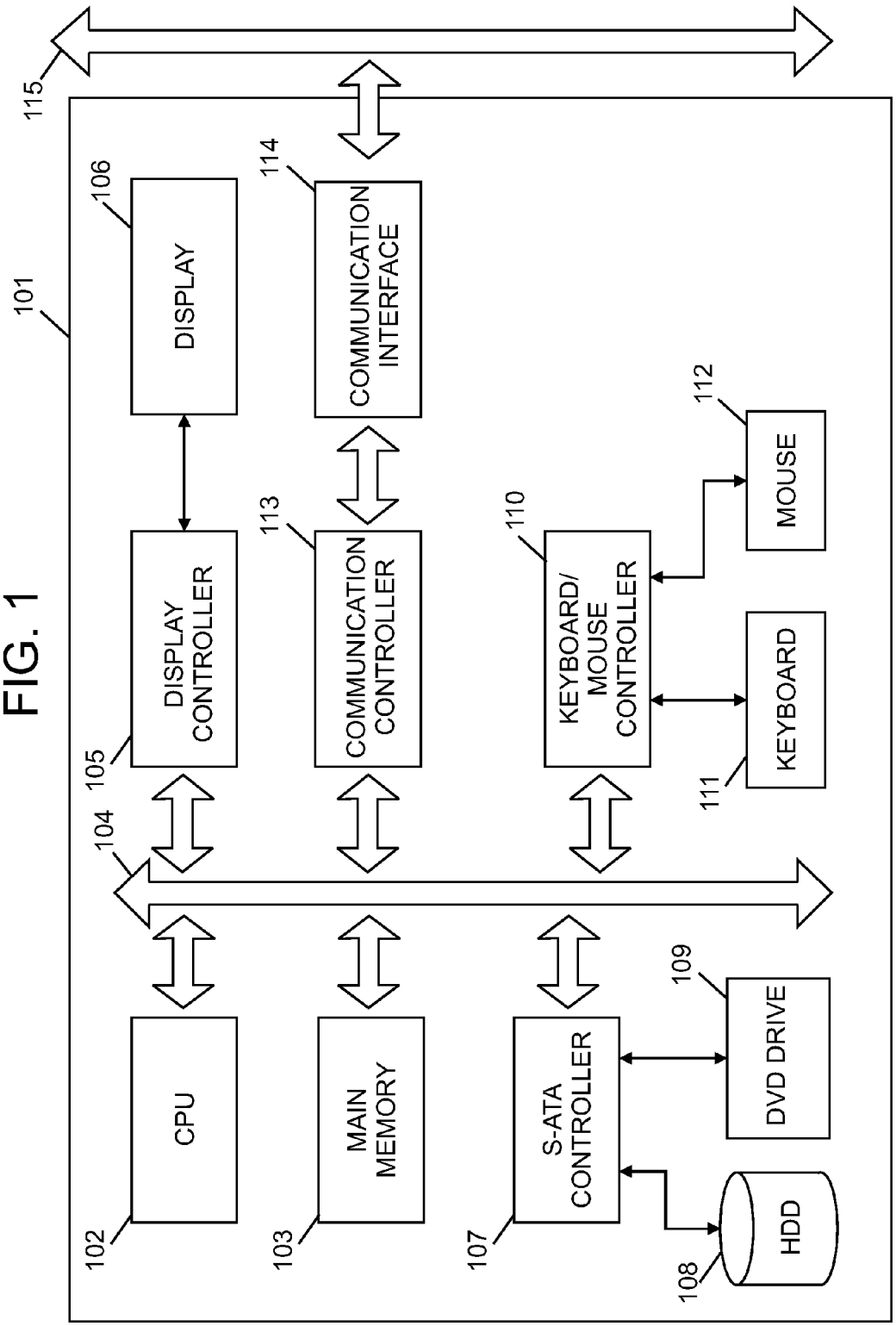

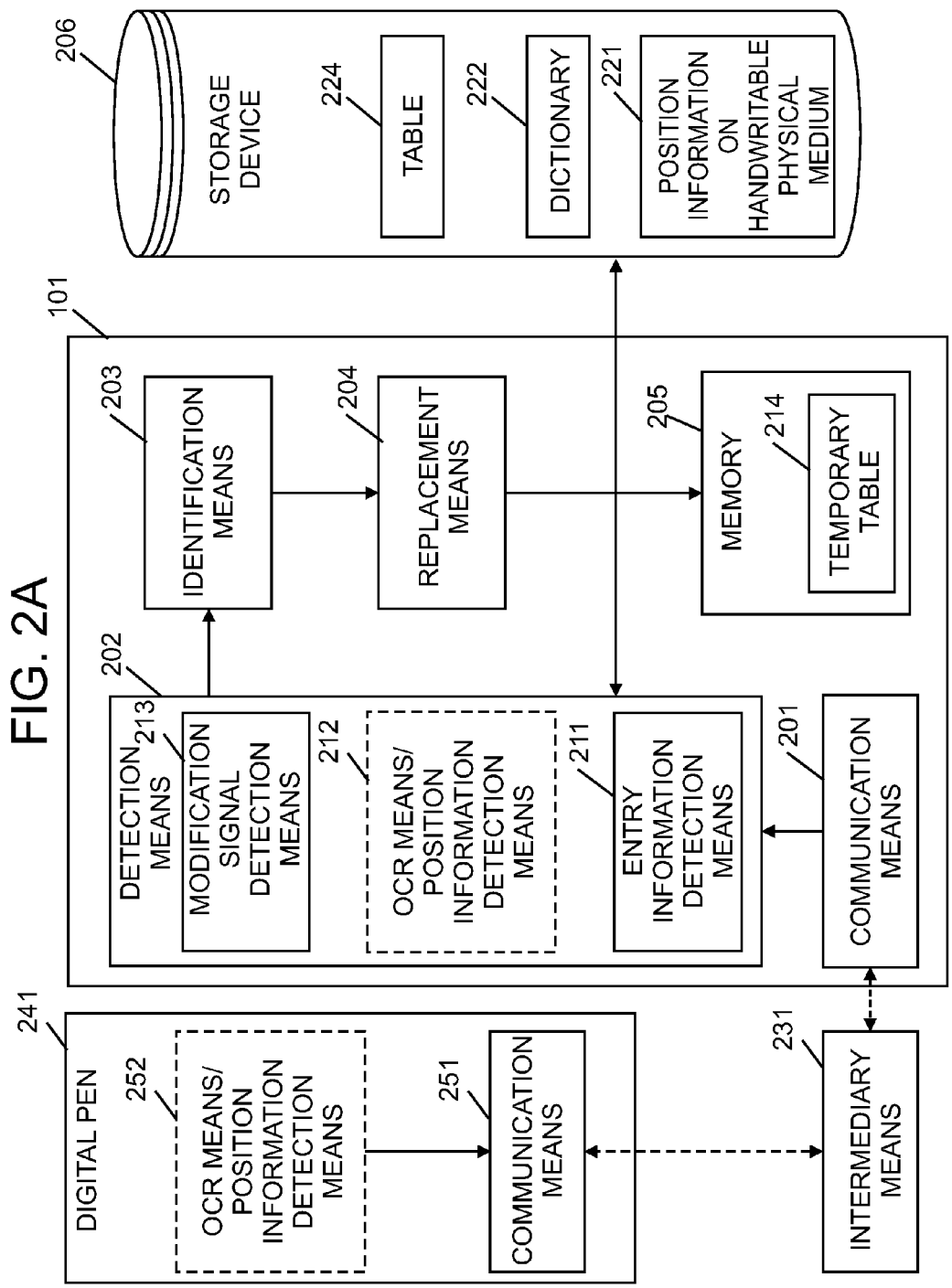

| ITEM | 36-INCH FLUORESCENT BULB | PRESENT INVENTORY QUANTITY | 0.00 | LAST DELIVERY DATE | MM/DD/YY |
| --- | --- | --- | --- | --- | --- |
| STORAGE LOCATION | CENTRAL STORAGE LOCATION | DELIVERED FIRM PREORDERED QUANTITY | 0.00 | ANNUAL TOTAL | 0.00 |
| LOT TYPE | NO LOT | DELIVERED TOTAL QUANTITY | 0.00 | DELIVERY QUANTITY IN PREVIOUS FISCAL YEAR | 0.00 |
| DELIVERY UNIT | INDIVIDUAL | OUT-OF-DATE INVENTORY QUANTITY | 0.00 | DELIVERY QUANTITY IN FISCAL YEAR BEFORE LAST | 0.00 |
| | | AVAILABLE QUANTITY | 0.00 | DELIVERY QUANTITY IN LAST FISCAL YEAR BUT TWO | 0.00 |

INVENTORY COSTS

| STATUS CODE | DESCRIPTION | STATUS RATE | STANDARD PRICE | AVERAGE PRICE | FINAL PURCHASE PRICE |
| --- | --- | --- | --- | --- | --- |
| | | 0.00 | 0.00 | 0.00 | 0.00 |

| STATEMENT OF WORK | MAINTENANCE OF ELECTRICAL FACILITY |
| LOCATION | SHIPMENT AND RECEIPT DEPARTMENT |
| ASSET | ELECTRICAL FACILITY |
| COMPONENT ITEM | ELECTRICAL CABLE |

DETAILS OF ASSET

- ASSET IN OPERATION? ☐
- WITH WARRANTY? ☐
- SLA APPLIED? ☐
- CHARGE STORAGE WAREHOUSE? ☐

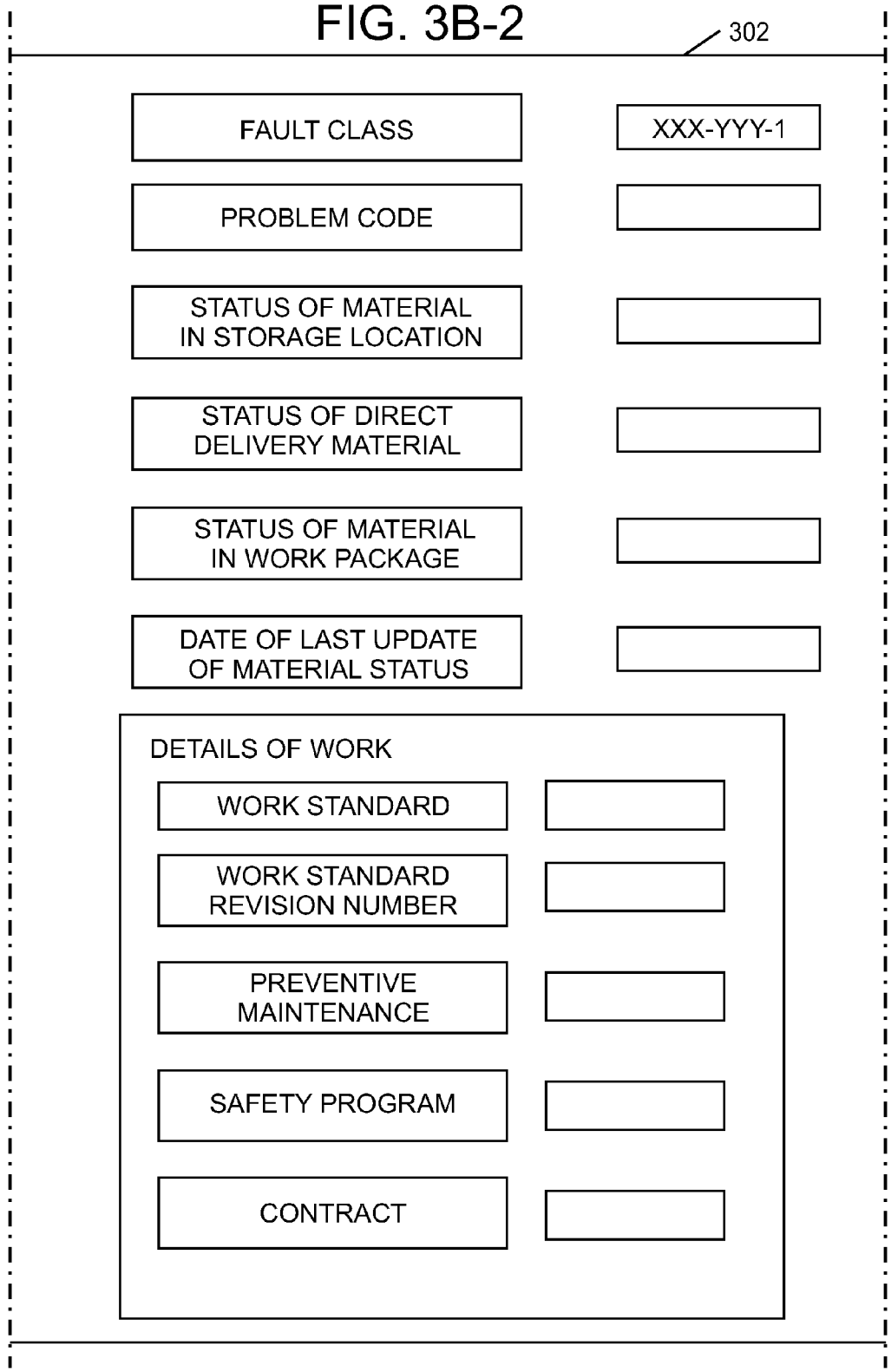

| STATUS | WAITING FOR SCHEDULE |
| STATUS CHANGE DATE | MM/DD/YY |

PRIORITY

- PRIORITY ☐
- JUSTIFICATION OF PRIORITY ☐
- RISK ASSESSMENT ☐

FIG. 3B

| FIG. 3B-1 | FIG. 3B-2 | FIG. 3B-3 | 302

SCHEDULE INFORMATION

| TARGET START | MM/DD/YY Hr/min |
| TARGET END | MM/DD/YY Hr/min |
| PROJECTED START DATE | MM/DD/YY |
| PROJECTED END DATE | MM/DD/YY |
| START ON OR AFTER: | MM/DD/YY |
| END BY: | MM/DD/YY |

RESPONSIBILITY

| REPORTER | | SUPERVISOR |
| REPORT DATE | | TEAM |
| PROXY | | PROJECT MANAGER |
| PHONE NUMBER | | WORK GROUP |
| FAX NUMBER | | |

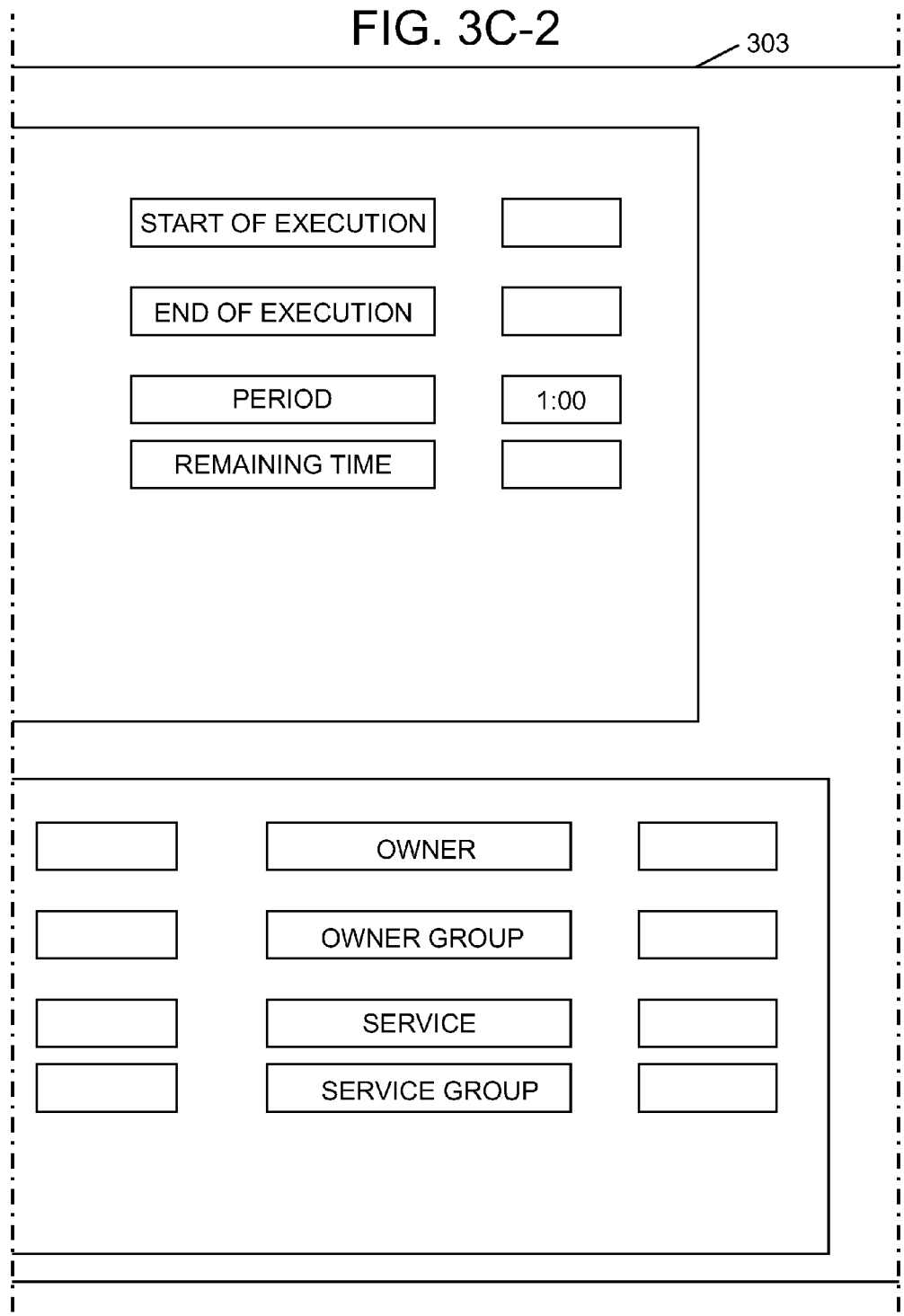

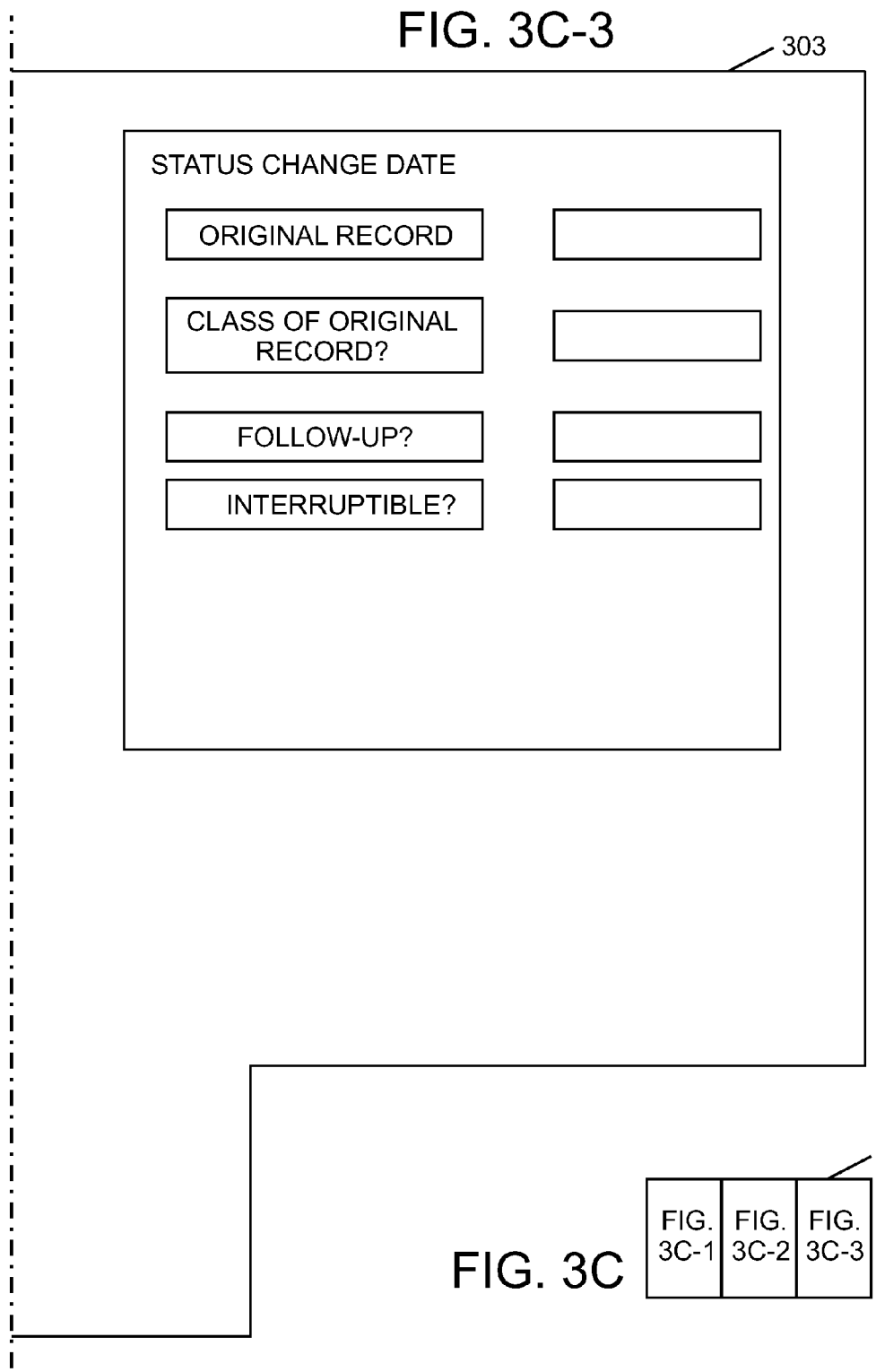

FIG. 3D
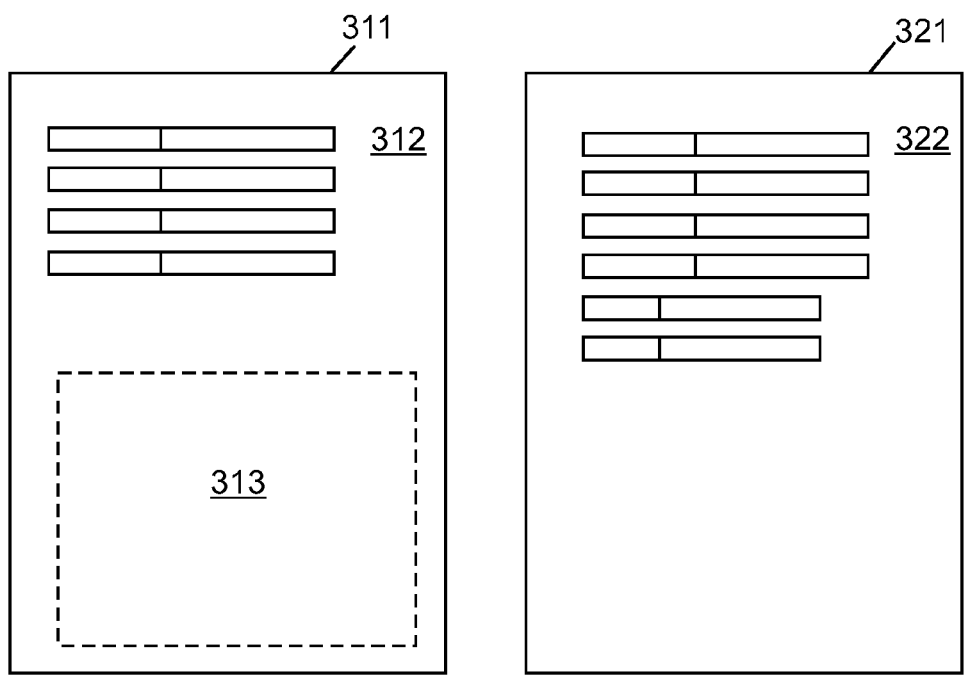
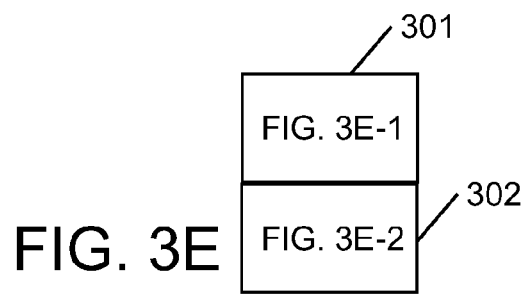
FIG. 3E

FIG. 3F-1

SCHEDULE INFORMATION — 351

- TARGET START — MM/DD/YY Hr/Min
- TARGET END — MM/DD/YY Hr/Min
- PROJECTED START DATE — MM/DD/YY
- PROJECTED END DATE — MM/DD/YY
- START ON OR AFTER: — MM/DD/YY
- END BY: — MM/DD/YY

- START OF EXECUTION
- END OF EXECUTION
- PERIOD — 1:00
- REMAINING TIME

STATUS CHANGE DATE — 352

- ORIGINAL RECORD
- CLASS OF ORIGINAL RECORD?
- FOLLOW-UP?
- INTERRUPTIBLE?

303

RESPONSIBILITY — 353

- REPORTER
- REPORT DT
- PROXY
- PHONE NO
- FAX NO

- SUPERVISOR
- TEAM
- PROJECT MANAGER
- WORK GROUP

354

- OWNER
- OWNER GROUP
- SERVICE
- SERV GRP

| INVOICE RECEIPT DATE | 2011/11/03 |
| SCHEDULED REMITTANCE DATE | 2011/11/05 |
| REMITTANCE 372 | XXX CO. |
| AMOUNT OF REMITTANCE | ¥50,000 |

| INVOICE RECEIPT DATE | 2011/11/03 |
| SCHEDULED REMITTANCE DATE | 2011/11/05 |
| REMITTEE 362 | XXX CO. |
| AMOUNT OF REMITTANCE | ¥50,000 |

| FIG. 3F-1 | FIG. 3F-2 |

| 432-1 | 432-2 | 433-1 | 433-2 | 433-3 | 433-4 |
|---|---|---|---|---|---|
| FIELD NUMBER | FIELD NAME | X ORIGIN | X ENDPOINT | Y ORIGIN | Y ENDPOINT |
| 0001 | INVOICE RECEIPT DATE | 50 | 100 | 30 | 50 |
| 0002 | SCHEDULED REMITTANCE DATE | 50 | 100 | 60 | 80 |
| 0003 | REMITTEE | 50 | 100 | 90 | 110 |
| 0004 | AMOUNT OF REMITTANCE | 50 | 100 | 120 | 140 |
| ...... | ...... | ...... | ...... | ...... | ...... |

403

⇕

402

| 422-3 | 422-4 | | 422-n |
|---|---|---|---|
| REMITTEE | AMOUNT OF REMITTANCE | ... | ...... |
| XXX CO. | 50,000 | ... | ...... |
| YYY CO. | 20,000 | ... | ...... |
| ...... | ...... | ... | ...... |

| FIG. 4C-1 | FIG. 4C-2 |
|---|---|

FIG. 4C

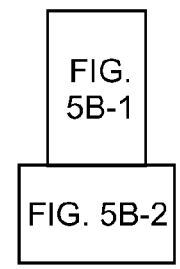
FIG. 5B
FIG. 5B-1
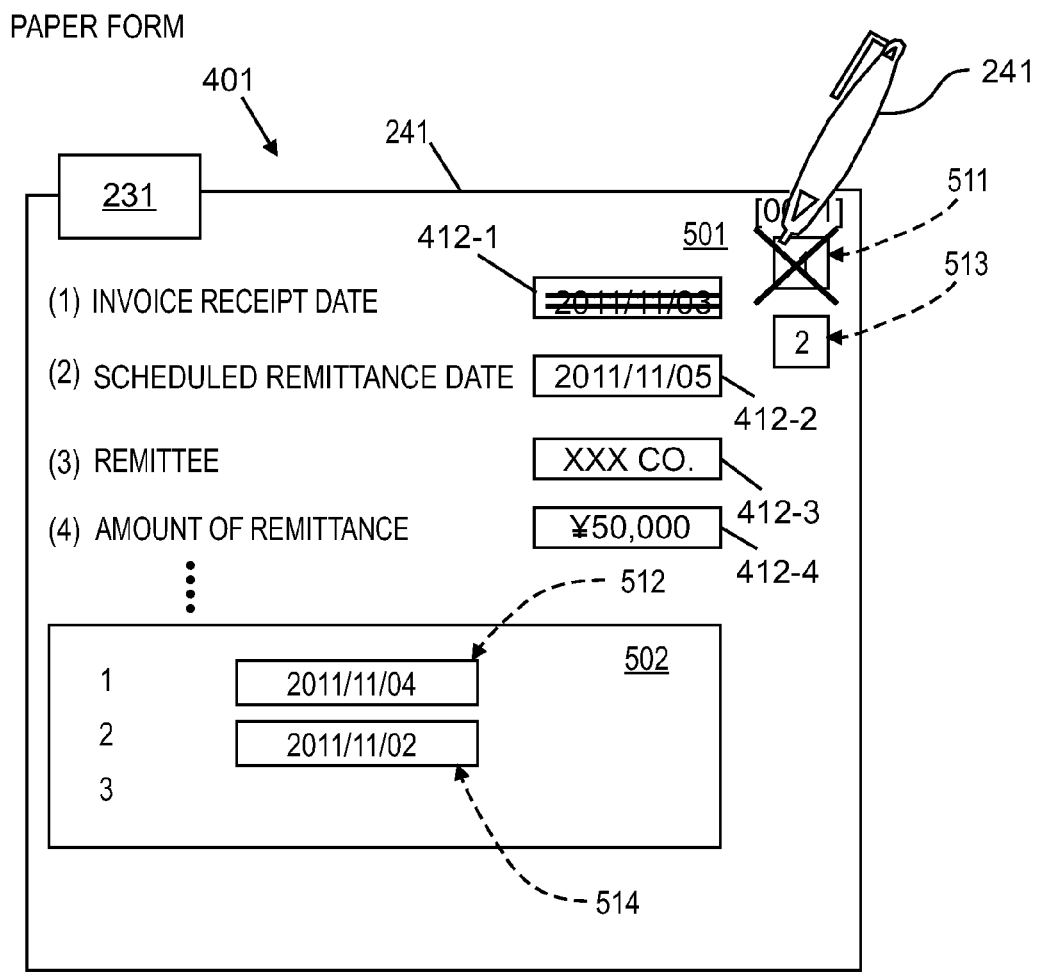

FIG. 6A
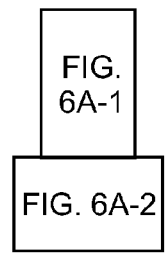
FIG. 6A-1
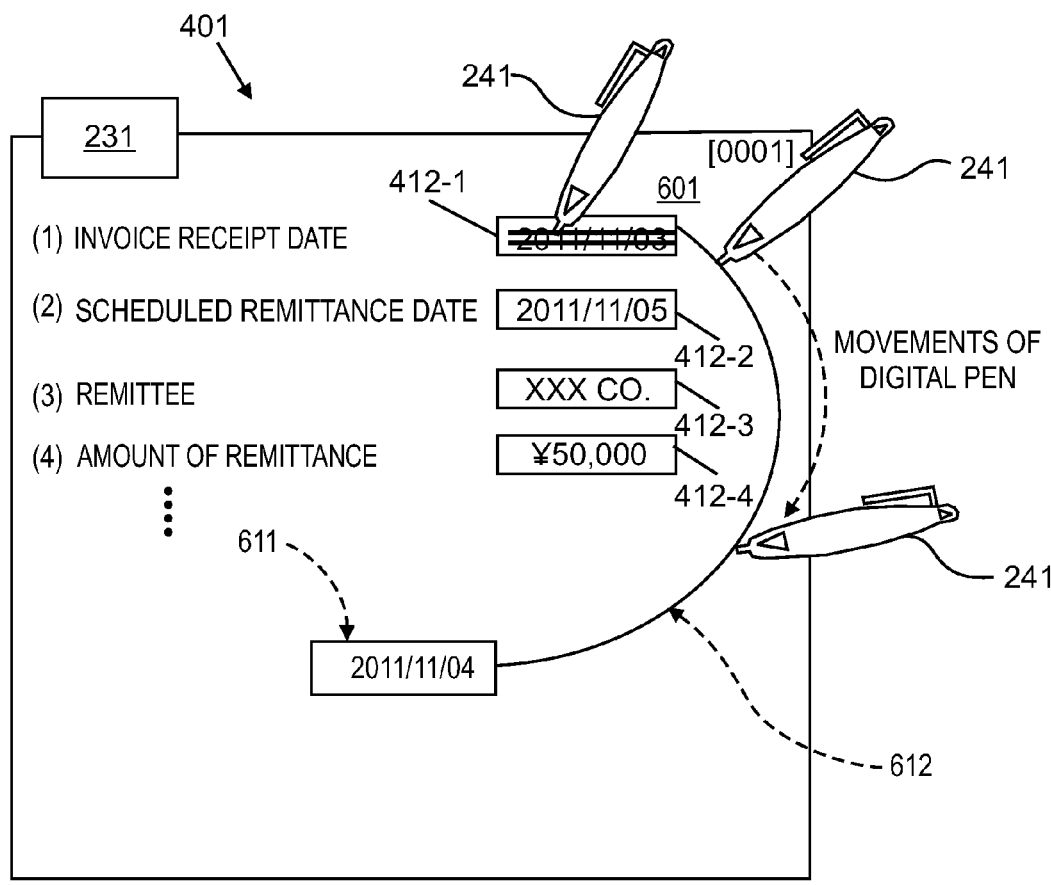

| TABLE | 422-0 FORM NUMBER | 422-1 INVOICE RECEIPT DATE | 422-2 SCHEDULED REMITTANCE DATE | 422-3 REMITTEE | 422-4 AMOUNT OF REMITTANCE |
|---|---|---|---|---|---|
| RECORD 1 | 0001 | 2011/11/04 | 2011/11/05 | XXX CO. | 50,000 |
| RECORD 2 | 0002 | 2011/11/08 | 2011/11/10 | YYY CO. | 20,000 |
| RECORD 3 | ...... | ...... | ...... | ...... | ...... |

REPLACE

| TABLE | 422-0 FORM NUMBER | 422-1 INVOICE RECEIPT DATE | 422-2 SCHEDULED REMITTANCE DATE | 422-3 REMITTEE | 422-4 AMOUNT OF REMITTANCE |
|---|---|---|---|---|---|
| RECORD 1 | 0001 | 2011/11/02 | 2011/11/05 | XXX CO. | 50,000 |
| RECORD 2 | 0002 | 2011/11/08 | 2011/11/10 | YYY CO. | 20,000 |
| RECORD 3 | ...... | ...... | ...... | ...... | ...... |

FIG. 6B-2

FIG. 6C
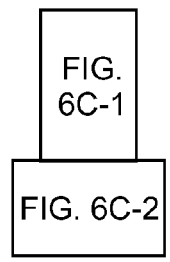
FIG. 6C-1
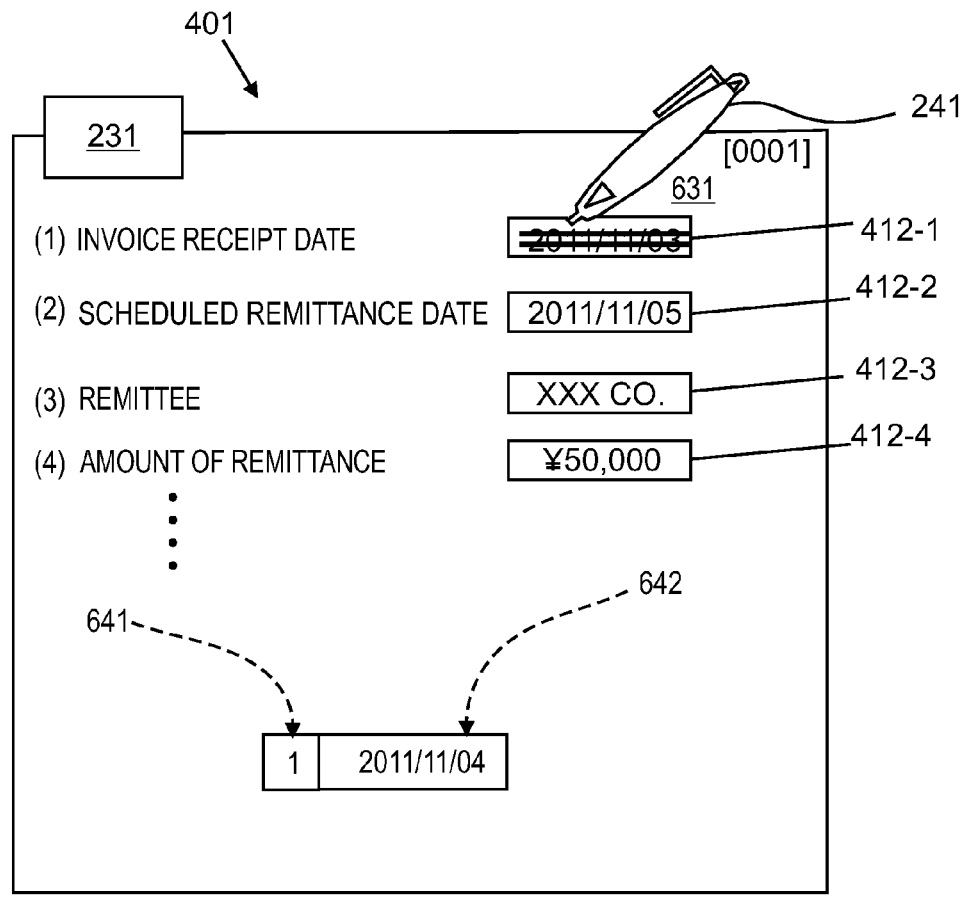

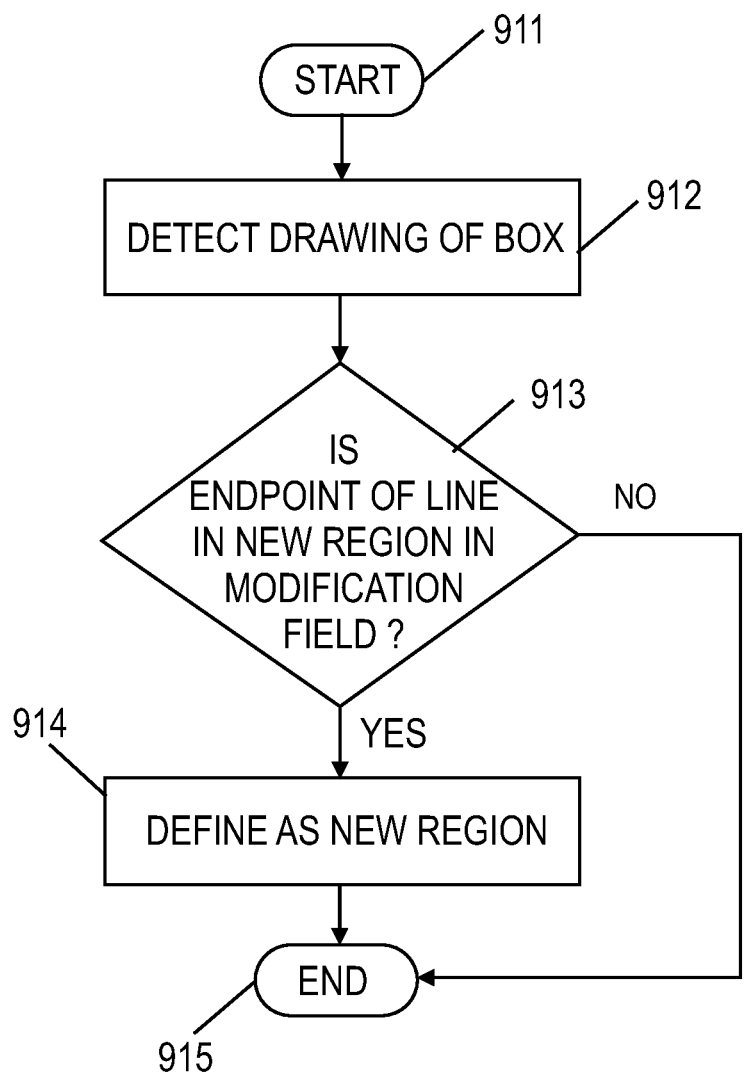

MODIFYING INFORMATION ON A HAND WRITABLE PHYSICAL MEDIUM WITH A DIGITAL PEN

PRIORITY

The present application claims priority to Japanese Patent Application No.: 2011-256528, filed Nov. 24, 2011, and all the benefits accruing therefrom under 35 U.S.C. §119, the contents of which is incorporated by reference herein in its entirety.

BACKGROUND

The present embodiment generally relates to a technique to automatically modify digital information by using a digital pen. More specifically, the present embodiment relates to a method for modifying information stored in storage means by modifying information on a hand writable physical medium with a digital pen, and an apparatus, computer program, and computer program product thereof.

More and more businesses are switching to digital documentation and personal computers or digital information terminals (for example personal digital assistants (PDAs) or tablets) are often used to directly prepare documents in business activities. However, some business activities, for example legal documentation or accounting documentation activities require keeping paper documents and therefore require preparation of paper documents, rather than digital documents. In other business activities, for example in nursing, rehabilitation or caring fields or building sites, handwriting on paper documents may be easier than keying into personal computers or PDAs (e.g., preparation of digital documents).

SUMMARY

One embodiment provides a method for modifying information stored in storage means by modifying information on a hand writable physical medium with a digital pen, wherein the hand writable physical medium includes a predetermined field including one or more item field name and one or more first region for information entry associated with the one or more item field name. The information stored in the storage means includes attribute values corresponding to each of the one or more item field name of the physical medium, and attribute values corresponding to information entered into each of the one or more first region. The method for modifying includes an apparatus communicable with the digital pen detecting that a modification symbol is added, by using the digital pen, to information which has been entered into any of the one or more first region in the predetermined field and identifying, based on detecting that the modification symbol is added, a pertinent item field name among the one or more item field names, wherein the pertinent item field name is associated with the one or more first region into which information to be modified is entered, based on position information of the digital pen when the modification symbol is added.

BRIEF DESCRIPTION OF SEVERAL VIEWS OF THE DRAWINGS

FIG. 2A is a functional block diagram of an apparatus preferably having the hardware configuration in FIG. 1, according to one embodiment;

FIG. 3A illustrates one example of a hand writable physical medium that can be used with the present embodiment and has a predetermined field including one or more item field names and an information entry region(s) (a first region(s)) associated with the item field name(s);

FIG. 3B illustrates one example of a hand writable physical medium that can be used with the present embodiment and has the predetermined field;

FIG. 3C illustrates one example of a hand writable physical medium that can be used with the present embodiment and has the predetermined field;

FIG. 3D is a diagram illustrating a hand writable physical medium that can be used with the present embodiment and has what are called in the present embodiment a predetermined field and a modification field and a hand writable physical medium that can be used with the present embodiment and has a predetermined field;

FIG. 3F is a diagram illustrating a hand writable physical medium that can be used with the present embodiment and has a predetermined field and a modification field and a hand writable physical medium that can be used with the present embodiment and has a predetermined field;

FIG. 9B illustrates a flowchart relating to the flowchart of FIG. 9A and illustrating a process for defining a region for information entry as being a region newly provided in a modification field.

DETAILED DESCRIPTION

Figure 2B:
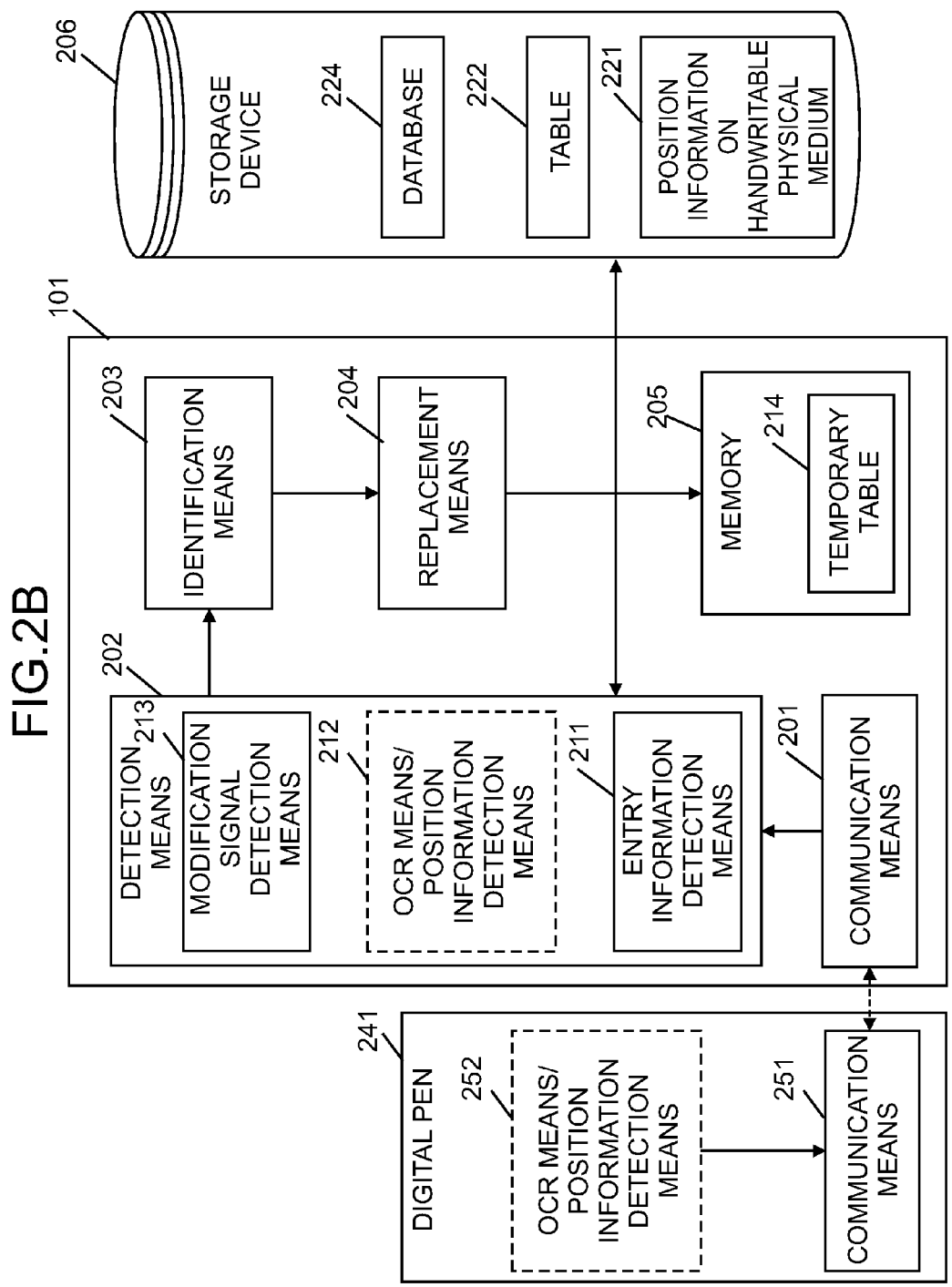
FIG. 2B is a functional block diagram of an apparatus preferably having the hardware configuration in FIG. 1, according to one embodiment.

When entering a character or numeral on a paper medium, it is inevitable to make modifications of a missed entry or misspelling. Moreover, depending on the manner in which a character or numeral entered on the paper medium is written, there may be a case that rewriting of the character or numeral is required. Particularly, in a case in which a character or numeral is entered on a paper document by using a digital pen, when the entered character or numeral is digitized it is necessary to modify the digitized character or numeral. Accordingly, the present embodiment provides a technique to facilitate such modification or rewriting as described above by use of a digital pen, and enable to reflect the pertinent modified character or numeral, or rewritten character or numeral in the digitization.

Further, upon entry of a character or numeral on a paper medium, an input to an electronic form corresponding to the paper medium is performed in an associated manner. Particularly, there is a benefit to arranging an entry on a paper medium with such modifications and rewritings as described above. The entry modifications are reflected in the input to electronic forms in real time. Accordingly, the present embodiment has its object to provide a technique to satisfy the above described demand.

Further, there is practical work to save a paper medium on which a character or numeral is entered, and the entered character or numeral is further modified for later reference as a revision history. Accordingly, the present embodiment provides a technique to satisfy the above described demands while satisfying the above described practical work.

The present embodiment provides a technique (a method, an apparatus and a computer program and computer program product) for allowing a user to modify information stored in storage means by modifying information on a hand writable physical medium with a digital pen. The physical medium includes a predetermined field. The predetermined field includes one or more item field names and a region or regions for entering information (hereinafter also referred to as a "first region") which are associated with the item field names. The information stored in the storage means may include attribute values corresponding to the item field names on the physical medium and attribute values corresponding to information entered in each of the first regions.

Embodiments will be described below in detail with reference to drawings. However, embodiments described below are not intended to limit the present embodiment defined in the claims and not all combinations of features described in the embodiments are essential to the inventive solution. It will be apparent to those skilled in the art that the present embodiment can be carried out in many different modes and various changes or improvements can be made to the embodiments described below.

In the following description, like reference numerals are given to like elements throughout the description of embodiments for carrying out the present embodiment unless otherwise stated.

Figures 1, 3E:
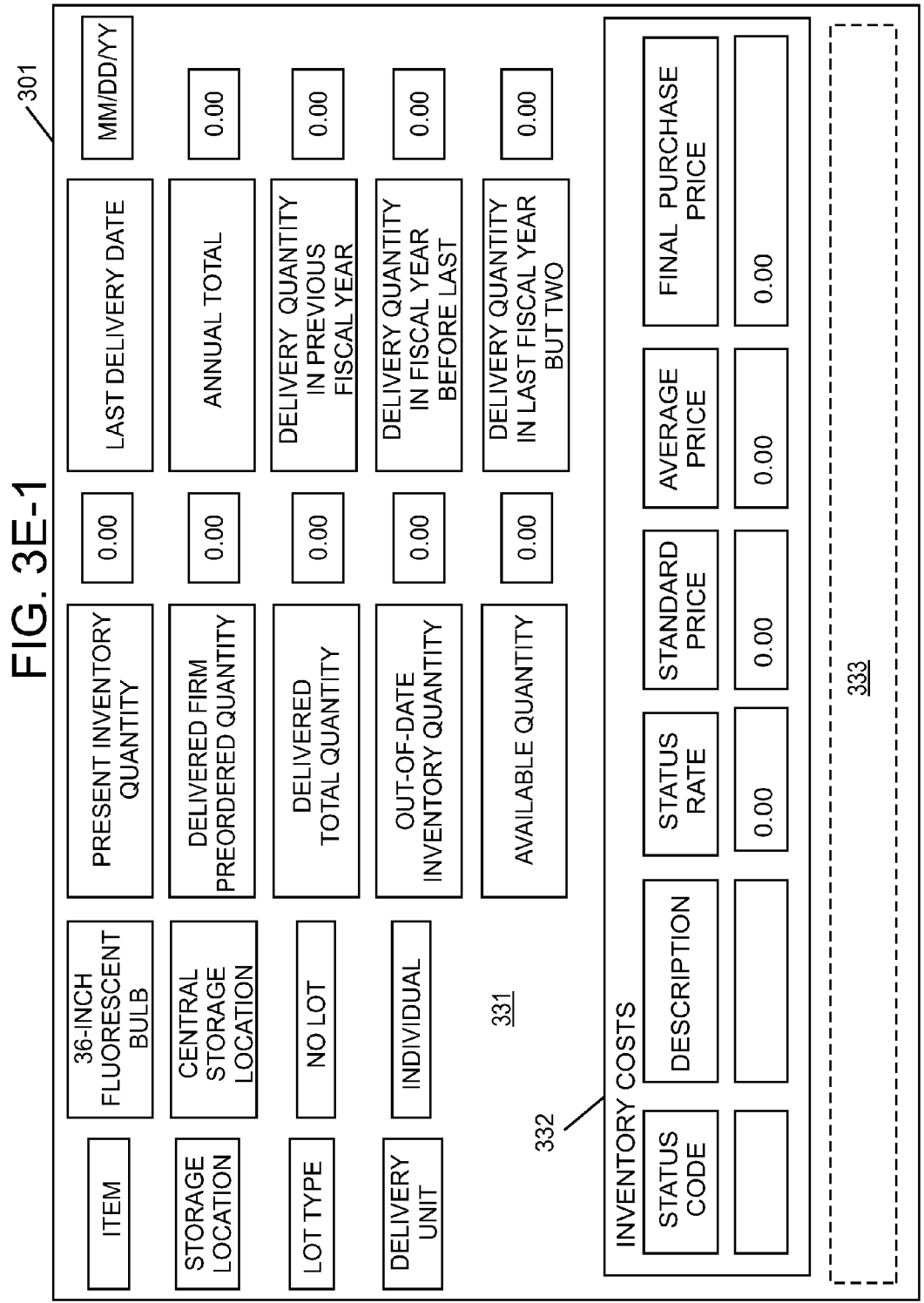
FIG. 1 is a diagram illustrating an exemplary hardware configuration of an information processing apparatus for implementing an apparatus according to an embodiment.
FIG. 3E is a diagram illustrating a hand writable physical medium that can be used with the present embodiment and has a predetermined field and a modification field and a hand writable physical medium that can be used with the present embodiment and has a predetermined field.
Figures 2, 3E:
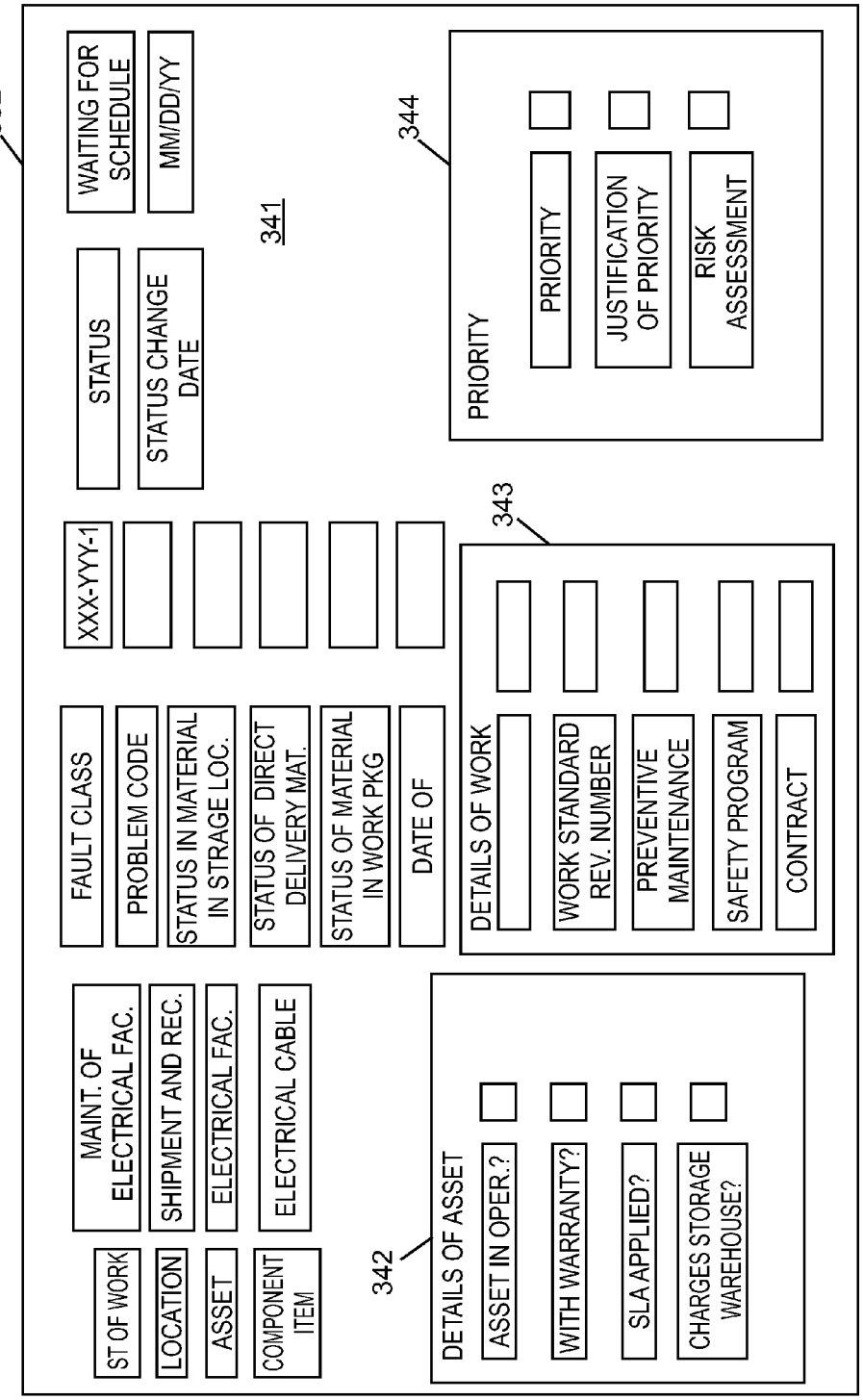

FIG. 1 is a diagram illustrating an exemplary hardware configuration of an apparatus according to an embodiment, for example an information processing apparatus for implementing a computer, a personal digital assistant (PDA), a tablet terminal, a smartphone, a gaming terminal, an internet television set, or a point-of-sales (POS) system.

The apparatus 101 includes a CPU 102 and a main memory 103, which are connected to a bus 104. The CPU 102 may be based on a 32-bit or 64-bit architecture and may be a Core i series processor, a Core 2 series processor, an Atom series processor, a Xeon series processor, a Pentium series processor, or a Celeron series processor from Intel Corporation, or an Opteron series processor, a Phenom series processor, an Athlon series processor, a Turion series processor, a Sempron series processor, or an A series processor from Advanced Micro Devices, Inc., or a Tegra mobile processor from NVIDIA. A display 106, for example a liquid-crystal display (LCD), can be connected to the bus 104 through a display controller 105. The display 106 may be embedded in the apparatus 101. The display 106 can be connected to the apparatus 101 by wire or radio. A disk 108, for example a silicon disk or a hard disk, and a drive 109, for example a compact disk (CD), digital video disk (DVD) or Blue-ray disk (BD) drive can also be connected to the bus 104 through a SATA or IDE controller 107. A keyboard 111 and a mouse 112 can also be connected to the bus 104 through a keyboard and mouse controller 110 or a USB bus.

An operating system and programs that provides a Java processing environment such as J2EE, a Java application, a Java virtual machine, a Java just-in-time compiler, and other programs and data are stored on the disk (108) in such a manner that they can be loaded into the main memory. A frontend processor, which is software that enables input or editing of text and character conversion software, is also stored on the disk 108 in such a manner that it can be loaded into the main memory. The operating system may be a Windows operating system provided by Microsoft Corporation, MacOS or iOS provided by Apple Computer Incorporated, a UNIX-based system including X Window System, or other operating system that supports a graphical user interface multi-window environment, such as Android.

The drive 109 is used for installing a program from a CD-ROM, DVD-ROM or BD onto the disk 108 as needed.

The communication interface 114 conforms to Ethernet, for example. The communication interface 114 is connected to the bus 104 through a communication controller 113, is responsible for physically connecting the apparatus 101 to a communication link 115, and provides a network interface layer to a TCP/IP communication protocol for a communication facility of the operating system of the apparatus 101. The communication link may be a wired LAN environment or a wireless LAN environment based on a wireless LAN connection standard such as IEEE 802.11a/b/g/n. The communication interface can include the functions of Bluetooth or infrared communication.

As can be seen from the foregoing description, a computer according to an embodiment of the present embodiment can be implemented by a system including a conventional computer such as a personal computer, workstation, or mainframe or a combination of these computers. A personal digital assistant and a tablet terminal according to an embodiment of the present embodiment may be a portable computer. A point-of-sales (POS) system according to an embodiment of the present embodiment can be implemented by installing POS system software onto any of the conventional computers given above.

It will be understood from the foregoing that an apparatus used in an embodiment of the present embodiment is not limited to a particular operating system environment.

FIG. 2A is a functional block diagram of an apparatus which preferably has the hardware configuration in FIG. 1 and is in accordance with one embodiment.

To implement the present embodiment, the apparatus 101 and a digital pen 241 that can communicate with the apparatus 101 are used.

The apparatus 101 can have the hardware configuration in FIG. 1. The apparatus 101 can communicate with the digital pen 241 through intermediary means 231 by wire or radio.

The apparatus 101 can include communication means 201, detection means 202, identification means 203, replacement means 204, a memory 205 and storage device 206.

The communication means 201 can be connected to the intermediary means 231 by wire or radio. The communication means 201 receives information or instructions from the digital pen 241 through the intermediary means 231 or sends information or instructions to the digital pen 241 through the intermediary means 231. If the communication with the intermediary means 231 is radio communication, the communication means 201 may include transmission and reception functions of Bluetooth or infrared communication. The communication means 201 provides information received from the digital pen 241 through the intermediary means 231 to the detection means 202.

The detection means 202 can include entry information detection means 211, OCR (Optical Character Recognition) means/position information detection means 212 and modification symbol detection means 213.

The entry information detection means 211 acquires data entered on a physical medium by a user with the digital pen 214, that is data indicating the locus of movement of the pen-tip of the digital pen 241, and provides the acquired information to the OCR means/position information detection means 212 and the modification symbol detection means 213.

The OCR means/position information detection means 212 converts a character or a numeric written on a physical medium into text or recognizes a graphic (the OCR means) on the basis of information from the digital pen 241 provided from the entry information detection means 211, and detects or calculates position information indicating the position of the digital pen 241 on the physical medium (hereinafter also referred to as the position information of the digital pen) on the basis of the information from the digital pen 241 (the position information detection means). The information from the digital pen 241 may be movements (that is, the locus) of the pen-tip of the digital pen 241, for example. The OCR means may be of any technology known to those skilled in the art. The OCR means and the position information detection means may be separate units.

The OCR means/position information detection means 212 may be included in the digital pen 241 itself 252 instead of the apparatus 101.

The modification symbol detection means 213 determines whether a user entry with the digital pen 241 is a modification symbol or not on the basis of information from the digital pen 241 provided from the entry information detection means 211. The modification symbol may be a strike-through (such as a single or double line), a cross, a wiggle line or other mark. The user can specify a modification symbol to use beforehand or can use any combination of the modification symbols mentioned above.

In response to detecting that a modification symbol is added on a hand writable physical medium with the digital pen 241, the identification means 203 identifies an item field name associated with a first region on the physical medium where entered information is to be modified, on the basis of the position information of the digital pen 241 at the time when the modification symbol has been added.

The replacement means 204 replaces an attribute value (an attribute value corresponding to information entered in a first region) in information stored in the memory 205, for example in a database 224 stored in the storage device 206 or in a temporary table 214 stored in the memory 205, with an attribute value corresponding to modified information (for example, an attribute value corresponding to information entered in a second region). The temporary table 214 may be all or part of the database 224. That is, the replacement means 204 updates an unmodified attribute value which is information stored in the memory 205 with a modified attribute value. The "information entered" is information written with the digital pen and may be a character, a numeric or a graphic. The "attribute value corresponding to information entered" is text converted from information written with the digital pen, or a value converted from the text for storing in the database. The text converted from information written with the digital pen may be a digitized character or numeric. The value converted from the text for storing in the database may be a serial value converted from a date, for example, if the text data is the date, or may be a character string or a numeric value converted from another particular character string.

The memory 205 can store a temporary table 214 which is all or part of information, for example a database 224, stored in the storage device 206. The memory 205 can also store paper form position data, as described below. The memory 205 may be a semiconductor memory, for example.

The storage device 206 may be provided inside (e.g., embedded in) the apparatus 101 or connected to the apparatus 101 through a cable or a wired or wireless intranetwork or internetwork. The storage device 206 may be a hard disk drive or a solid-state drive.

The storage device 206 can store information 221 indicating a position on a hand writable physical medium (hereinafter also referred to as position information 221, a dictionary 222 and a database 224. The storage device 206 can also store paper form position data, as described below.

It should be noted that the term storage means as used herein encompasses the memory 205 and the storage device 206 and is not limited to any one of them.

The position information 221 can contain position information of a region on a hand writable physical medium where an item field name is entered (hereinafter also referred to as an item field name region) and position information of a region for information entry, associated with the item field name. Alternatively, the position information 221 may contain only position information of a region for information entry, associated with the item field name.

The dictionary 222 may be a word dictionary used during character recognition by the OCR means. The dictionary 222 may be prepared by a method known to those skilled in the art.

The database 224 stores item field names on hand writable physical medium and characters or numerals entered in information entry regions associated with the item field names. In the present embodiment, a character or a numeral entered in an information entry region may be stored in a file or memory as data in a simple list format (for example in a plain text format or CSV format), instead of a database.

The digital pen 241 is a pen having a pen-tip capable of directly writing characters or numerals or graphics on a hand writable physical medium. The apparatus 101 can track the location of the pen-tip (which may a ball-point pen, for example) of the digital pen by using a sonar, for example, as the digital pen 241 moves around and can digitize information written on the physical medium upon writing. The digital pen 241 may be any digital pen such as MV pen commercially available from MVPen technologies Ltd., airpen commercially available from Pentel Inc., TegakiPAD commercially available from Zebra Pen Corporation, and Inkling commercially available from Wacom Co., Ltd.

The digital pen 241 may include communication means 251 and optionally OCR means/position information detection means 252. The digital pen 241 may also include a small liquid-crystal display. The liquid-crystal display can display a message, for example an error message, provided from the apparatus 101. The digital pen 241 may include a vibrator (not shown) for vibrating the digital pen 241. The vibrator can cause a vibration in response to receiving a message, for example an error message, from the apparatus 101. The digital pen 241 may include a speaker for emitting a sound. The speaker may provide an audible message, for example an audible error message from the apparatus 101.

The communication means 251 sends locus data of the pen-tip to the apparatus 101 through the intermediary means 231. The communication means 251 also sends instructions from the digital pen 241 through the intermediary means 231. The communication means 251 receives information or instructions from the apparatus 101 through the intermediary means 231.

The OCR means/position information detection means 252 converts characters or numerals written on a physical medium to text or recognizes a graphic, on the basis of information read by the digital pen 241 (the OCR means) and detects or calculates position information indicating the location of the digital pen 241 on the physical medium (position information of the digital pen) on the basis of position information from the digital pen (the position information detection means). The OCR means may be any of the technology known to those skilled in the art. The OCR means and the position information detection means may be separate units. The digital pen 241 may be an Anoto pen.

The digital pen 241 has a pen-tip at its one end. The pen-tip may be any pen-tip that can write characters, numerals, graphics or the like on hand writable physical media. The pen-tip may be a ball-point pen or a pen that can write characters, numerals, graphics or the like on a screen of an information processing terminal, for example. A hand writable physical medium may be a paper medium, an electronic paper medium, or an information processing terminal including a hand writable screen. A paper medium may be any paper medium of any paper quality or characteristics on which characters can be written. An electronic paper medium may be an electronic memo pad, for example an electronic device including a pressure-sensitive liquid-crystal display. An electronic paper medium may be an electronic memo pad, "Boogie Board" commercially available from iMPROV ELECTRONICS, a subsidiary of Kent Displays of the U.S. An information processing terminal including a hand writable screen may be a portable information terminal, for example a tablet terminal or a PDA.

The intermediary means 231 can receive infrared rays (light) and ultrasonic waves (sound) emitted from the pen-tip of the digital pen 241 for example to determine movements of the pen-tip and render the determined data (which may be locus data of movements of the pen-tip) as digital pen information. The intermediary means 231 may be an intermediary device or intermediary module which is a separate hardware device. The intermediary means 231 sends the digital pen information to the apparatus 101. The intermediary means 231 may include an infrared sensor and an ultrasonic sensor for receiving infrared rays (light) and ultrasonic waves (sound), respectively, emitted from the pen-tip of the digital pen 241. The intermediary means 231 can be clipped, for example, in a given space at the upper left corner of a physical medium. Preferably, a mark indicating the clip-on position is printed in a given space at the upper left corner of the physical medium.

The apparatus 101 may be an electronic forms system, for example. The electronic forms system may be Tivoli Service Request Manager or Maximo Asset Management commercially available from International Business Machines Corporation.

FIG. 2B is a functional block diagram of an apparatus which preferably has the hardware configuration illustrated in FIG. 1 and is in accordance with one embodiment. The mode illustrated in FIG. 2B differs from the one illustrated in FIG. 2A in that a digital pen 241 is capable of directly communicating with the apparatus 101. The apparatus 101 illustrated in FIG. 2B, for example communication means 201 may include the function of the intermediary means 231 illustrated in FIG. 2A. The rest of the mode illustrated in FIG. 2B is the same as the configuration in FIG. 2A.

FIG. 3A illustrates one example of a hand writable physical medium that can be used with the present embodiment and has a predetermined field.

The hand writable physical medium 301 illustrated in FIG. 3A is an example of a paper form for inventory control.

The physical medium 301 that can be used with the present embodiment includes a predetermined field. The predetermined field includes one or more item field names and information entry region(s) associated with the item field name(s) (e.g., first field(s)). The item field names may be numerals, symbols, or characters or combinations of these, or a meaningful title. The regions where the item field names are written are set as boxes, for example rectangular or square boxes disposed in predetermined regions (hereinafter referred to as "item field name regions") on the hand writable physical medium 301. However, the regions where item field names are written do not necessarily need to be indicated clearly by boxes. The regions (e.g., first regions) associated with the item field names are spaces where a user enter information with the digital pen 241. The first regions are preferably set as boxes in predetermined regions on the hand writable physical medium 301.

In FIG. 3A, the item field names are "Item", "Storage Location", "Lot Type" and "Delivery Unit", to name but a few. The items of information entered in the first regions in FIG. 3A are "36-inch Fluorescent Bulb", "Central Storage Location", "No lot" and "Individual", to name but a few.

FIG. 3B illustrates one example of hand writable physical medium that can be used with the present embodiment and includes a predetermined field.

The hand writable physical medium 302 illustrated in FIG. 3B is an example of paper form which is a management form for work instructions.

FIG. 3C illustrates one example of hand writable physical medium that can be used with the present embodiment and includes a predetermined field.

The hand writable physical medium 303 illustrated in FIG. 3C is an example of paper form, which is a management form for work instructions.

FIG. 3D is a diagram illustrating hand writable physical media that can be used with the present embodiment. FIG. 3D illustrates a physical medium 311 including what are called in the present embodiment a predetermined field and a modification field and a physical medium 321 including a predetermined field.

The physical medium 311 in the left-hand part of FIG. 3D includes a predetermined field 312 and a modification field 313. The predetermined field 312 includes one or more item field name regions (left) for entering one or more item field names and information entry regions (first regions) (right) individually associated with the item field name regions. One item field name region may be associated with one or more first regions. Each of the item field name regions may be a box, for example a rectangular or square box that is visible to users, or is not visible to users but can be identified as a predetermined region that encloses a prewritten item field name. Similarly, each of the first regions is a box that is identifiable and visible to users. An item field name region and a first region associated with the item field name region may be two boxes coupled side by side or stacked atop each other (that is, the regions may be adjoined to one another) or may be separately disposed close to each other. In the physical medium 311 illustrated in FIG. 3D, the predetermined field 312 includes four sets of item field name regions and their associated first regions. The modification field 313 can be set in an area different from the predetermined field 312 on the physical medium 311. In other words, an area outside the area set as the modification field 313 can be the predetermined field 312. In FIG. 3D, the modification field 313 is defined by a dashed line. The modification field 313 may be defined (or set) in any fashion that makes the modification field 313 distinguishable to users from the predetermined field 312. For example, the modification field 313 may be defined by a solid line instead of the dashed line or may be colored (pale yellow, for example) beforehand. The modification field 313 may be printed beforehand on the physical medium 311 or may be dynamically set by a user drawing with the digital pen 241. The modification field 313 is used for modifying information entered in any of the first regions with the digital pen 241. A method for modifying information entered in a first region on the physical medium 311 with the digital pen 241 will be described later in detail with reference to FIG. 8.

The physical medium 312 in the right-hand part of FIG. 3D includes a predetermined field 322. The predetermined field 322 includes item field name regions (left) for entering one or more item field names and a region(s) for information entry (first regions, right) individually associated with the item field name region(s). The item field name regions and the first regions are as described with respect to the physical medium 311. In the physical medium 321 illustrated in FIG. 3D, the predetermined field 322 includes six sets of item field name regions and their associated first regions. Unlike the physical medium 311 illustrated in the left-hand part of FIG. 3D, the physical medium 321 illustrated in the right-hand part of FIG. 3D does not include a modification field. A method for modifying information entered in a first region on the physical medium 321 with the digital pen 241 will be described later in detail with reference to FIGS. 9A to 9D.

FIG. 3E is a diagram illustrating hand writable physical media that can be used with the present embodiment. FIG. 3E illustrates a medium including a predetermined field and a modification field and a medium including a predetermined field.

The example of physical medium illustrated in the upper part of FIG. 3E is the same as the physical medium 301 illustrated in FIG. 3A. The physical medium 301 includes predetermined fields 331 and 332 and a modification field 333. A use can draw or print an information entry field (a third region) beforehand in the modification field 333 on the physical medium 301. Alternatively, a user can dynamically set a region for information entry (a fourth region) by drawing with the digital pen 241.

The example of physical medium illustrated in the lower part of FIG. 3E is the same as the physical medium 302 illustrated in FIG. 3B. The physical medium 302 includes predetermined fields 341 to 344. However, the physical medium 302 does not include a modification field. A user can set a region for information entry (e.g., a fifth or sixth region) in a blank space in the predetermined field 341 on the physical medium 302 by drawing with the digital pen 241.

FIG. 3F is a diagram illustrating examples of hand writable physical media that can be used with the present embodiment. FIG. 3F illustrates a medium including a predetermined field and a modification field and a medium including a predetermined field.

The example of physical medium in the upper part of FIG. 3F is the same as the physical medium 303 illustrated in FIG. 3C. The physical medium 303 includes predetermined fields 351 to 354. However, the physical medium 303 does not include a modification field. A user can set a region for information entry (a fifth or sixth region) in blank spaces in the predetermined fields 351 and 353 on the physical medium 303 and in the predetermined field 354 by drawing with the digital pen 241.

Examples of hand writable physical media 361 and 371 illustrated in the lower-left part and the lower-right part of FIG. 3F are examples of paper forms and are invoice forms.

The physical medium 361 includes a predetermined field 362. The predetermined field 362 includes item field names, "Invoice Receipt Date", "Scheduled Remittance Date", "Remittee" and "Amount of Remittance", and regions (first regions) that are associated with these item field names and contain information, "2011/11/03", "2011/11/05", "XXX Co." and "¥50,000", respectively. The physical medium 361 also includes a modification field 363. The modification field 363 includes one or more modification field names 364. The modification field names may be numerals, symbols, characters or combinations of these, for example. The modification field 363 may further include a region(s) for information entry 365 associated with the modification field name(s) 364. The region for information entry 365 may be printed on the physical medium 361 beforehand or may be dynamically drawn in the modification field 363 by a user with the digital pen 241.

A method for modifying information entered in a first region on the physical medium 361 with the digital pen 241 will be described later in detail with reference to FIGS. 5A and 8.

The physical medium 371 includes a predetermined field 372. The predetermined field 372 includes the same item field names (e.g., "Invoice Receipt Date", "Scheduled Remittance Date", "Remittee" and "Amount of Remittance") as the physical medium 361 and regions containing information (first regions) associated with the item field names. However, the physical medium 371 does not include a modification field. A method for modifying information entered in a first region on the physical medium 371 with the digital pen 241 will be described later in detail with reference to FIGS. 6A to 6D and 9A to 9D.

Figure 4A:
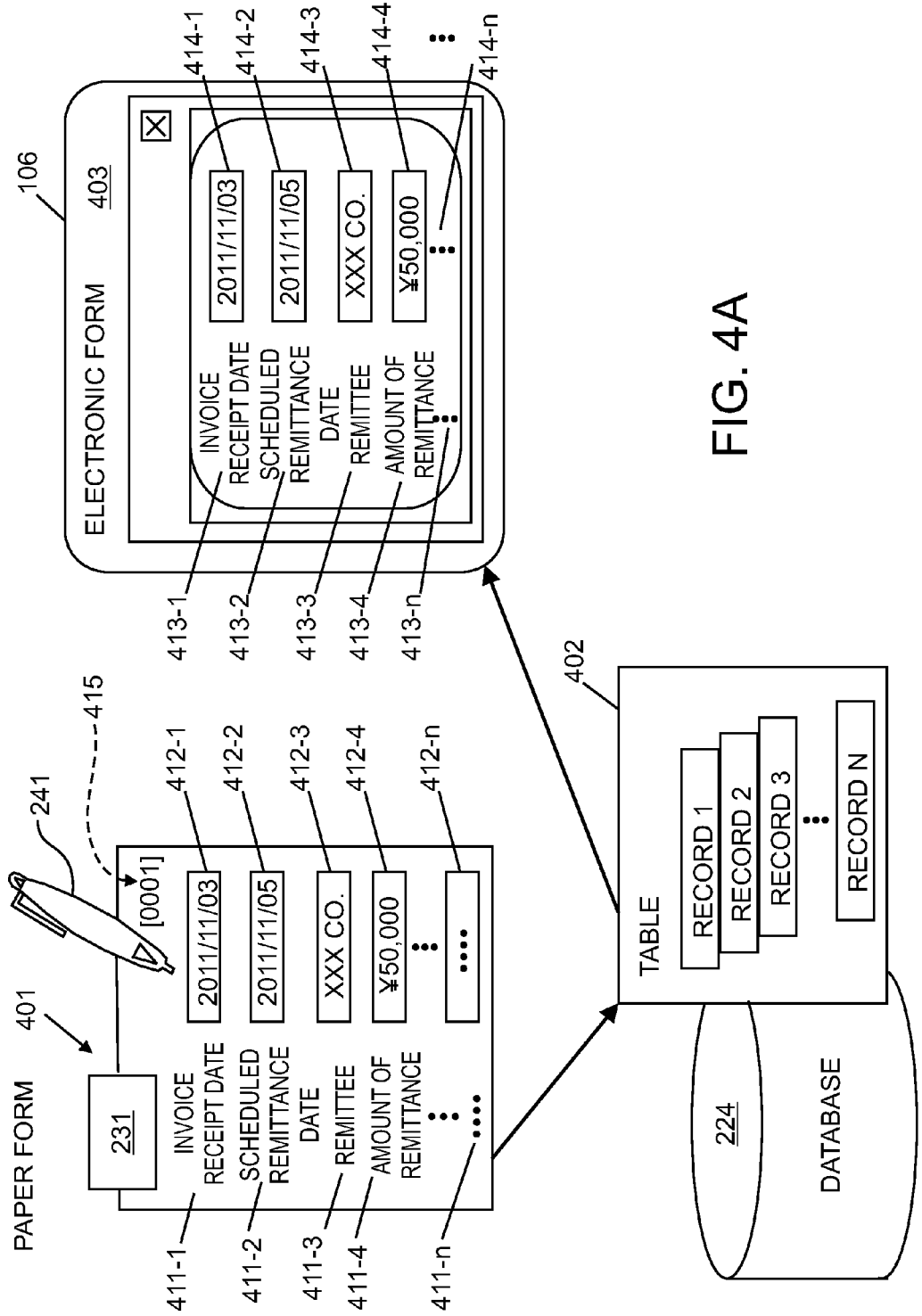
FIG. 4A is a diagram illustrating the relationship between a hand writable physical medium (an example of a paper form) that can be used with the present embodiment and information (an example of an electronic form) displayed on a display connected to an apparatus.

FIG. 4A is a diagram illustrating the relationship between a paper form 401, which is an example of hand writable physical medium that can be used with the present embodiment, and information (an example of electronic form) displayed on a display 106 connected to the apparatus 101.

Intermediary means 231 is attached to the paper form 401.

The paper form 401 includes item field names 411-1 to 411-n, where n is an integer and regions for information entry 412-1 to 412-n (first regions) associated with the item field names 441-1 to 411-n, respectively. The item field names 411-1 to 411-n and information entered in their corresponding first regions 412-1 to 412-n may be stored in the storage device 206 as a database 224 or in the memory 205 as records. Alternatively, information entered in the first regions 412-1 to 412-n may be stored in a text format such as the CSV format or other comma-separated format, or an application-specific storage format. The paper form 401 may include a form number 415 for identifying that single paper form. The form number 415 may be written or printed in any of the four corners of the paper form 401, for example. There can be one form number 415 for each paper form 401.

The database 224 includes a table 402. The table 402 contains one or more records 1 to N (where N is an integer). Each of the records 1 to N is associated with one paper form. It is assumed in the following description that record 1 is associated with the record of the paper form 401. The records will be described below in detail with reference to FIG. 4B.

Information stored in each of records 1 to N may optionally be displayed as information in each electronic form 403 on the display 106. Item names 413-1 to 413-n of the electronic form 403 are text information (attribute values corresponding to the item field names) converted from the item field names 441-1 to 411-n written on the paper form 401, which is a physical medium. Items of information 414-1 to 414-n on the electronic form 403 are text information (attribute values corresponding to the information entered in the first regions) converted from the information 412-1 to 412-n entered in the first regions on the physical medium 401.

Figure 4B:
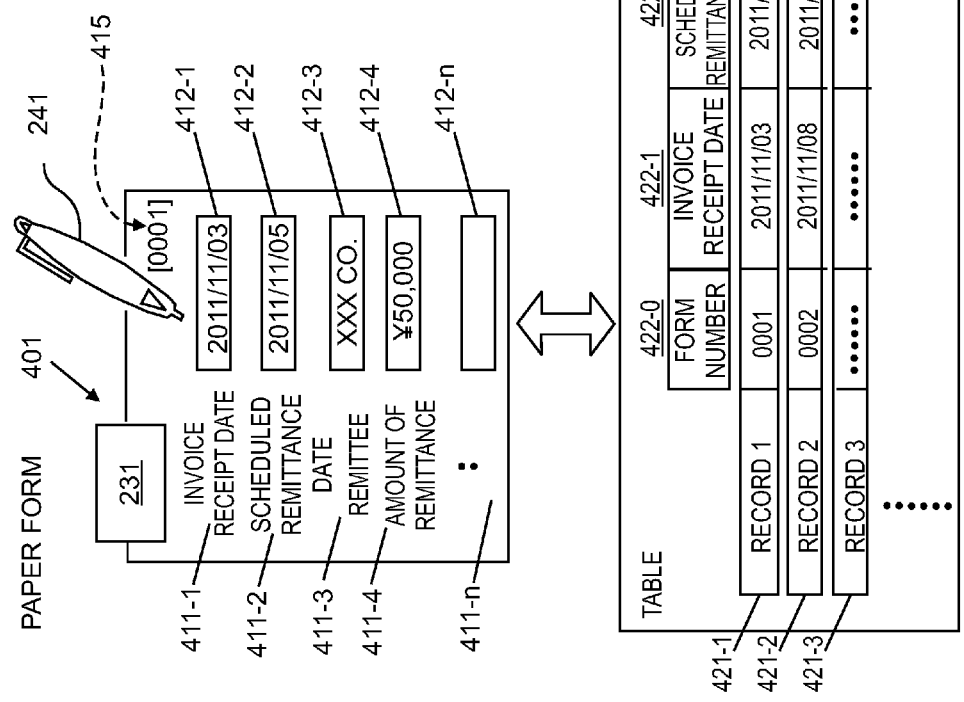
FIG. 4B is a diagram illustrating the relationship between a hand writable physical medium (an example of a paper form) that can be used with the present embodiment and information (an example of a table) stored in storage means of an apparatus.

FIG. 4B is a diagram illustrating the relationship between a paper form 401, which is an example of hand writable physical medium that can be used with the present embodiment, and information (an example of table) 402 stored in the storage means 205, 206 of the apparatus 101.

The paper form 401 illustrated in FIG. 4B is the same as the paper form 401 illustrated in FIG. 4A.

Record 1 421-1 includes attribute name 0 "Form Number" corresponding to the form number 415 of the paper form 401 and attribute names 1 to n 411-1 to 422-n, where n is an integer corresponding to the item field names 411-1 to 411-n on the paper form 401. Attribute name 0 "Form Number" is equivalent to the primary key in database terminology. In FIG. 4B, attribute name 1 422-1 in record 1 421-1 is "Invoice Receipt Date", which is an item field name 411-1 on the paper form 401; attribute name 2 422-2 is "Scheduled Remittance Date", which is an item field name 411-2; attribute name 3 422-3 is "Remittee", which is an item field name 411-3; and attribute name 4 422-4 is "Amount of Remittance", which is an item field name 411-4.

Record 1 421-1 includes the form number 415 of the paper form 401 and attribute values 422-1 to 422-n corresponding to information entered in the first regions 412-1 to 412-n of the paper form 401. The attribute value of attribute name 1 422-1 in record 1 421-1 is the attribute value "2011/11/03" corresponding to information entered in a first region 412-1; the attribute value of attribute name 2 422-2 in record 1 421-1 is the attribute value "2011/11/05" corresponding to information entered in a first region 412-2; the attribute value of attribute name 3 422-3 in record 1 421-1 is the attribute value "XXX Co." corresponding to information entered in a first region 412-3; and the attribute value of attribute name 4 422-4 in record 1 421-1 is the attribute value "50,000" corresponding to information entered in a first region 412-4.

Figures 1, 4C:
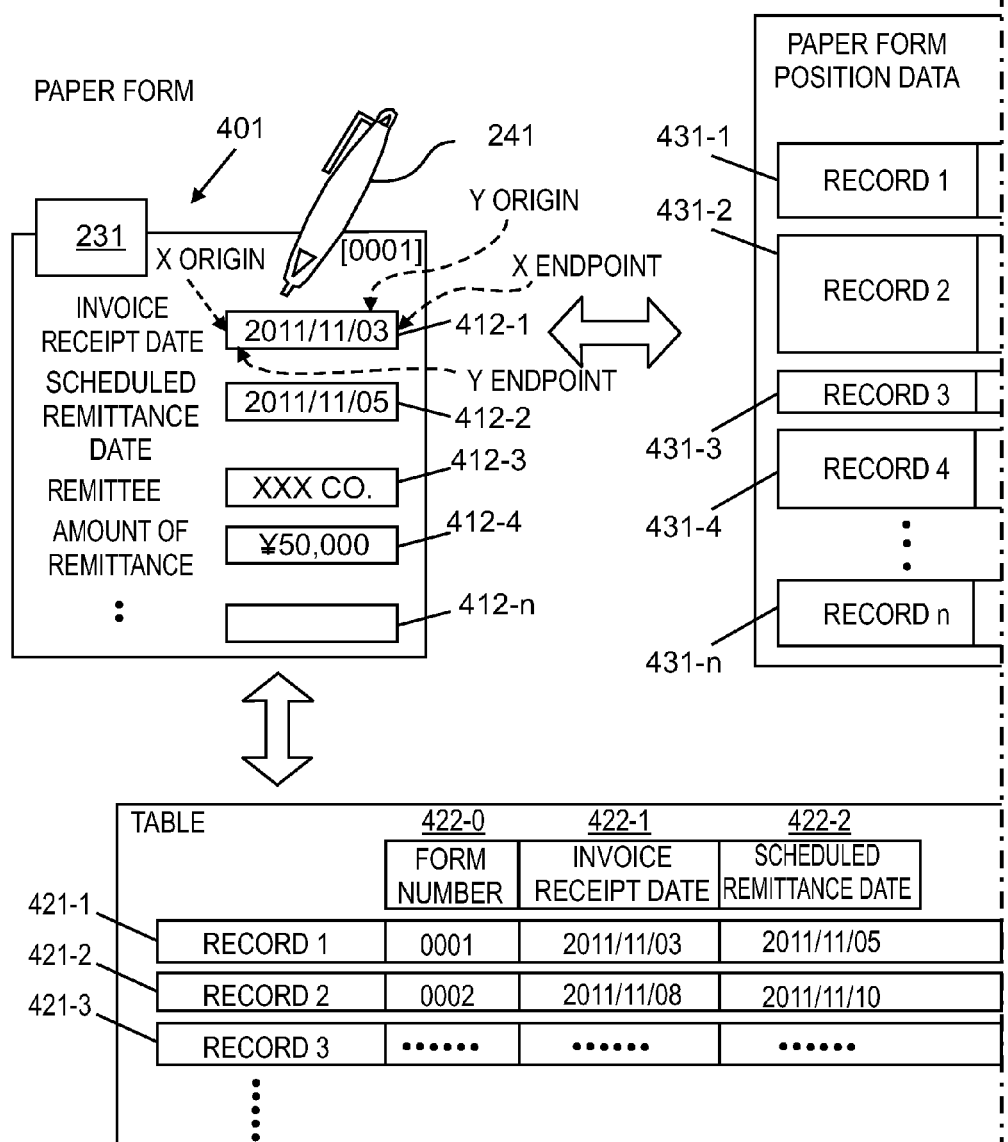
FIG. 4C is a diagram illustrating the relationship among a hand writable physical medium (an example of a paper form), information (an example of a table) stored in storage means of an apparatus and paper form position data stored in the storage means of an apparatus.

FIG. 4C is a diagram illustrating the relationship among a paper form 401, which is an example of hand writable physical medium that can be used with the present embodiment, information (an example of table) stored in the storage means 205, 206 of the apparatus 101, and paper form position data (an example of table) stored in the storage means 205, 206 of the apparatus 101.

The paper form 401 illustrated in FIG. 4C is the same as the paper form 401 illustrated in FIG. 4A. Here, let the X-axis be the horizontal axis of the paper form 401 and the Y-axis be the vertical axis of the paper form 401.

The paper form position data 403 can be created for each Table 402 record. Records 1 to n 431-1 to 431-n in the paper form position data 403 are data that are held in order to associate a field name 432-2 with input positions 433-1 to 433-3. Each of the records 431-1 to 431-n in the paper form position data 403 contains a field number 433-1, a field name 432-2 corresponding to one of the item field names 411-1 to 411-n on the paper form 401, and the physical positions 433-1 to 433-3 of one of the first regions 412-1 to 412-n of the paper form 401. The field number 433-1 is equivalent to the primary key in database terminology. Field names 432-2 correspond to attribute names 1 431-1 to n 431-n in the paper form position data 403. The physical positions 433-1 to 433-3 are physical positions on the paper form 401 that correspond to each of the field names 432-2 and can be represented as an X origin 433-1, an X endpoint 433-2, a Y origin 433-3 and a Y endpoint 433-4, for example.

If the first regions are printed on the paper form, their X origins 433-1, X endpoints 433-2, Y origins 433-3 and Y endpoints 433-4 can be registered in the paper form position data 403 beforehand. The positions can be determined by, for example, scanning the printed paper form by OCR to obtain their coordinates, or by tracing each of the first regions with the digital pen 241, or by pointing at the four corners of the each of the first region 412-1 to 412-n with the digital pen 241.

If the first regions 412-1 to 412-n are not printed on the paper form and are drawn with the digital pen 241, their X origins 433-1, X endpoints 433-2, Y origins 433-3 and Y endpoints 433-4 can be calculated and dynamically registered in the paper form position data 403.

In the paper form position data 403 in FIG. 4C, the X origin 433-1, X endpoint 433-2, Y origin 433-3 and Y endpoint 433-4 of each of the first regions 412-1 to 412-n of the paper form 401 are contained in records 1 to n. The paper form position data 403 may further contain: the X origin and endpoint and Y origin and endpoint of each item field name or item field name region; X origin and endpoint and Y origin and endpoint of each predetermined field; the X origin and endpoint and Y origin and endpoint of each region for information entry (fifth or sixth region) set in the predetermined field; the X origin and endpoint and Y origin and endpoint of the region of each modification field name associated with the predetermined field region; the X origin and endpoint and Y origin and endpoint of the modification field; the X origin and endpoint and Y origin and endpoint of an information entry region (third or fourth region) set in the modification field, and X origin and endpoint and Y origin and endpoint of the region of the modification field name associated with the modification field region. For example, if the paper form 401 is the paper medium 361 illustrated in FIG. 3F, that is, the paper form 401 includes a modification field, the field name 432-1 in the paper form position data 403 may be blank and the paper form position data 403 may further include records containing the X origin 433-1, X endpoint 433-2, Y origin 433-3 and Y endpoint 433-4 of each region for information entry 365 associated with the modification field name.

Figure 5A:
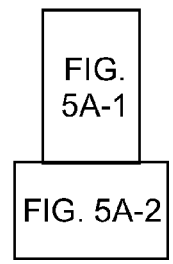
FIG. 5A is a diagram illustrating that a modification field is used to modify information according to one embodiment.
Figures 1, 5A:
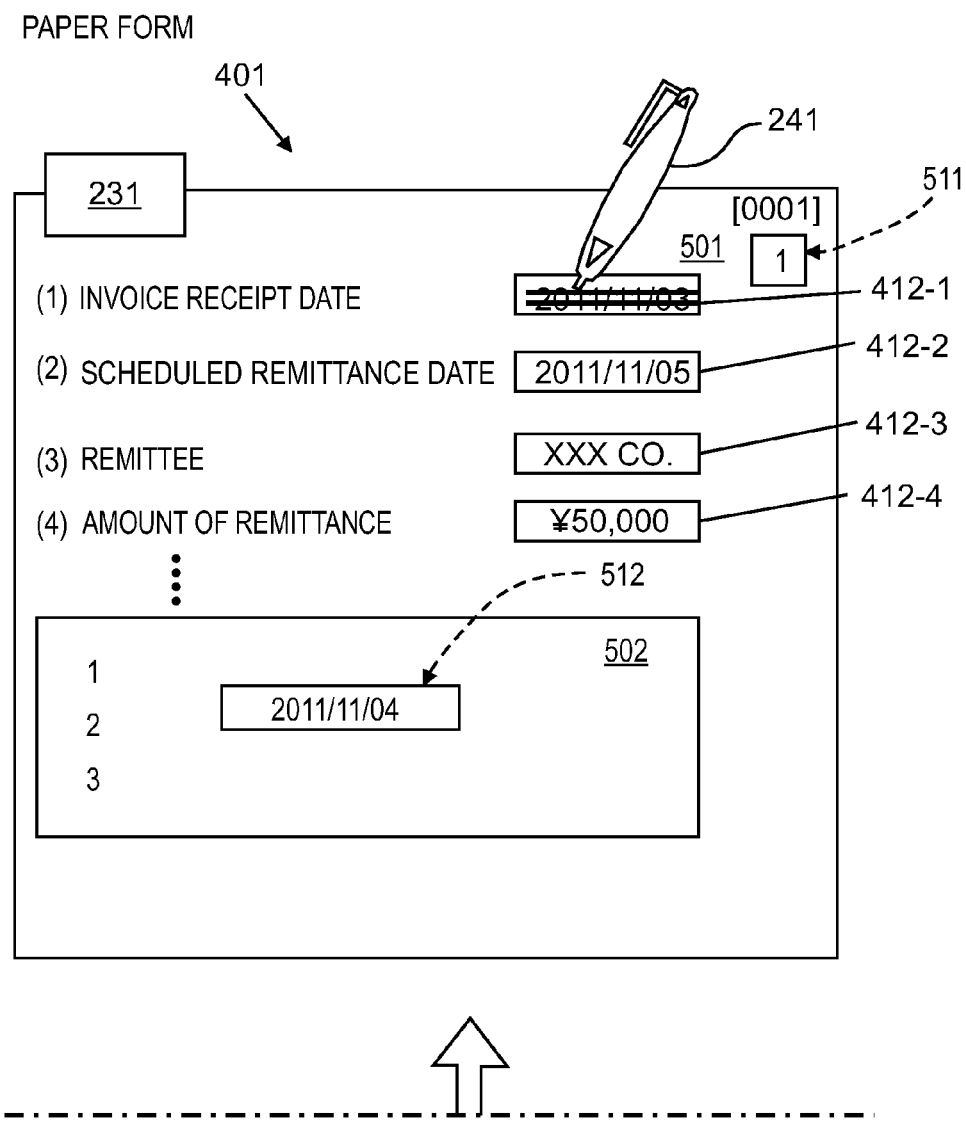
Figures 2, 5A:
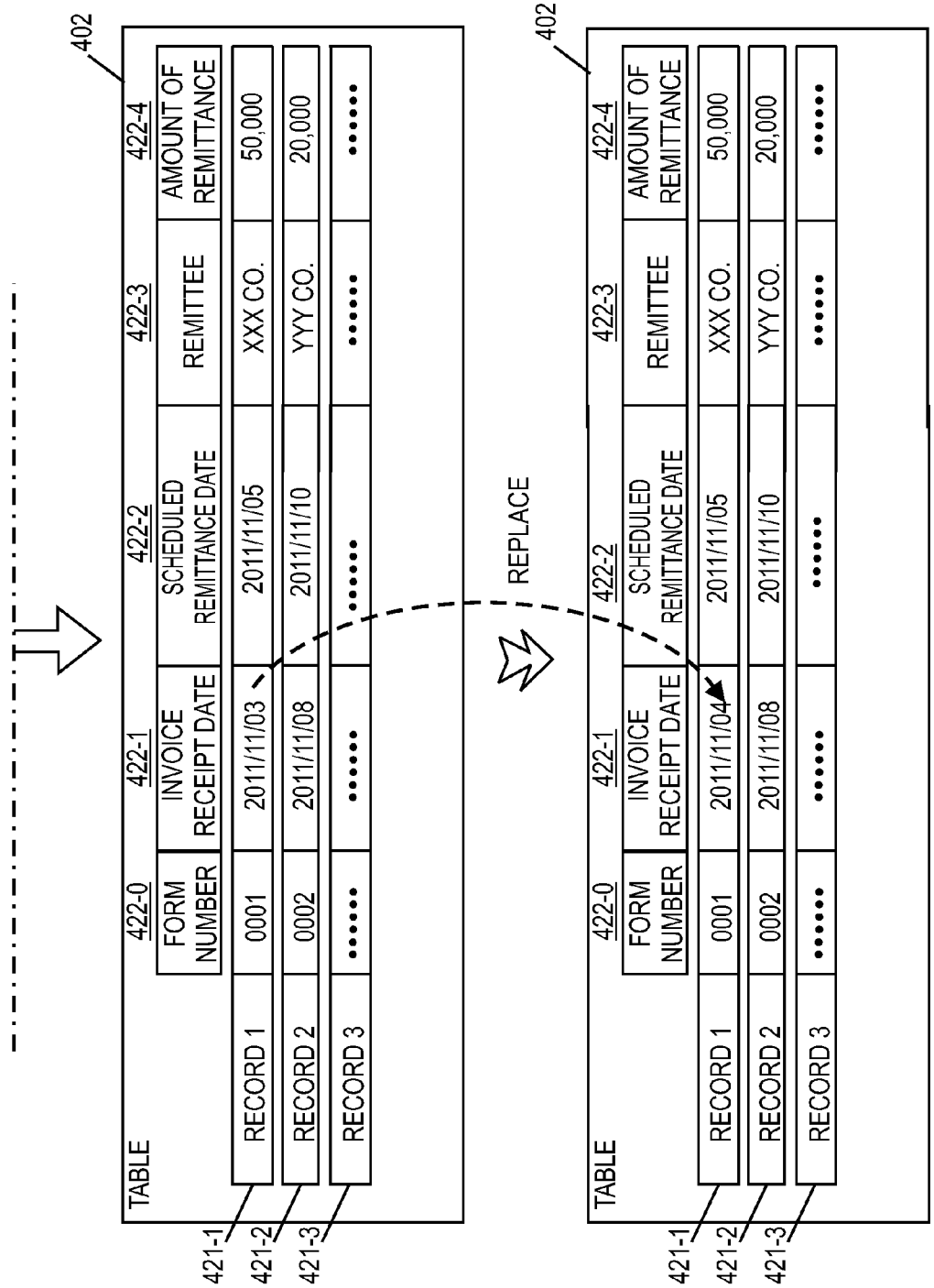

FIG. 5A is a diagram illustrating that a modification field is used to modify information according to one embodiment of the present embodiment.

The paper form 401 illustrated in FIG. 5A is the same as the paper form 361 illustrated in FIG. 3F. The paper form 401 includes a predetermined field 501 and a modification field 502. Intermediary means 231 is attached to the paper form.

Suppose that a user wants to modify information "2011/11/03" entered as information corresponding to an item field name, "Invoice Receipt Date", to "2011/11/04". To accomplish the modification, the user uses a digital pen 241 to perform the following operations 1a to 5a.

(1a) The user uses the digital pen 241 to draw a strikethrough, for example a double line "=" or a cross on "2011/11/03" or in the first region 412-1 in which "2011/11/03" is entered.

(2a) Then the user uses the digital pen 241 to draw a box 511 adjacent to or near an item field name region or a first region 412-1 in which the item field name "Invoice Receipt Date" is entered. The box 511 may be of any size that accommodates the number "1" for identifying a modification field name as described in the operation described below 3a.

(3a) The user then enters the number "1" in the box 511 for identifying the modification field name in the modification field 502 with the digital pen 241. Entering the number associates the first region 412-1 with the region 512 associated with the identified modification field name "1". In one mode, it can be considered that the region where an attribute value of the item field name "Invoice Receipt Date" is entered is changed from the first region 412-1 to the region 512 associated with identified modification field name "1", for example. The association can be accomplished by changing the coordinate values (the X origin, X endpoint, Y origin and Y endpoint) of attribute name 1 in record 1 in the paper form data 403 illustrated in FIG. 4C, for example, from the coordinate values of the first region to the coordinate values of the region 512 associated with the identified modification field name "1".

(4a) Then, if a region for entering a modification has not been drawn or entered beforehand in the modification field 502, the user performs the following operation. The user uses the digital pen 241 to draw a box 512 (a fourth region) near the modification field name "1" in the modification field 502. The box 512 may be of any size that accommodates the modification "2011/11/04" as described in operation 5a below. On the other hand, if a region for modification entry (a third region) associated with the modification field name "1" is printed beforehand in the modification field 502, the user proceeds to the next operation 5a.

(5a) Then the user writes the modification "2011/11/04" in the box 512 with the digital pen 241.

As a result of the sequence of operations 1a to 5a described above, the attribute value of attribute name 1 422-1 in record 1 421-1 in the table 402 changes from the initial entered value "2011/11/03" to the newly entered value "2011/11/04".

The operations 1a to 5a for modifying information using a modification field have been described from a user's point of view. A method for modifying information using the modification field will be described in A1 to E1 below from the viewpoint of the apparatus 101 according to the present embodiment (See also a flowchart in FIG. 8).

(A1) In response to the operation 1a performed by a user, the apparatus 101 acquires information from the digital pen 241 through the communication means (201) and detects, through the modification symbol detection means 213, that a double line, which is a modification symbol, has been added. Upon the detection, the apparatus 101 uses the identification means 203 to identify an item field name among the item field names "Invoice Receipt Date", "Scheduled Remittance Date", "Remittee" and "Amount of Remittance" that is associated with a first region 412-1 to 412-n in which the modification symbol has been added to information. The identification means 203 identifies the first region 412-1 associated with the item field name "Invoice Receipt Date" on the basis of information indicating the position on the physical medium 401 where the digital pen 241 was located at the time of the addition of the modification symbol.

B1 In response to the operation 2a performed by the user, the apparatus 101 acquires information from the digital pen 241 through the communication means 201 and uses the entry information detection means 211 and the OCR means/position information detection means 212 to detect that a box 511 has been drawn. Since the box 511 was detected following the addition of the modification symbol, the apparatus 101 recognizes that the box 511 is a region provided for entering a modification field name 364.

C1 In response to the operation 3a performed by the user, the apparatus 101 uses the entry information detection means 211 and the OCR means/position information detection means 212 to identify the number "1" entered in the box 511. If a region for modification entry (a third region) is printed beforehand in the modification field 502, the apparatus 101 associates the box 512 (the third region) with the first region 412-1.

D1 In response to the operation 4a performed by the user, the apparatus 101 associates the box 512 (a fourth or fifth region) with the first region 412-1 by using the identification means 203. The association can be accomplished by changing the coordinate values (the X origin, X endpoint, Y origin and Y endpoint) of attribute name 1 in record 1 in the paper form data 403 illustrated in FIG. 4C from the coordinate values of the first region to the coordinate values of the region 512 associated with the identified modification field name "1".

E1 Upon entry of the modification "2011/11/04" into the box 512 by the operation 5a performed by the user, the replacement means 204 uses the entry information detection means 211 and the OCR means/position information detection means 212 to clear the field name 432-1 "Invoice Receipt Date" in record 1 431-1 in the paper form position data 403 and enter the field name "Invoice Receipt Date" into a field name 432-2 of a record (for example record 100 (not shown)) provided beforehand for storing physical position data of a modification entry region (a third region) associated with modification field name "1". The apparatus 101 also uses the entry information detection means 211 and the OCR means/position information detection means 212 to convert the information written in the box 512 to text. Then the replacement means 204 replaces the attribute value "2011/11/03" of attribute name 1 422-1 in record 1 421-1 in the table 402 with that text, "2011/11/04".

Figures 2, 5B:
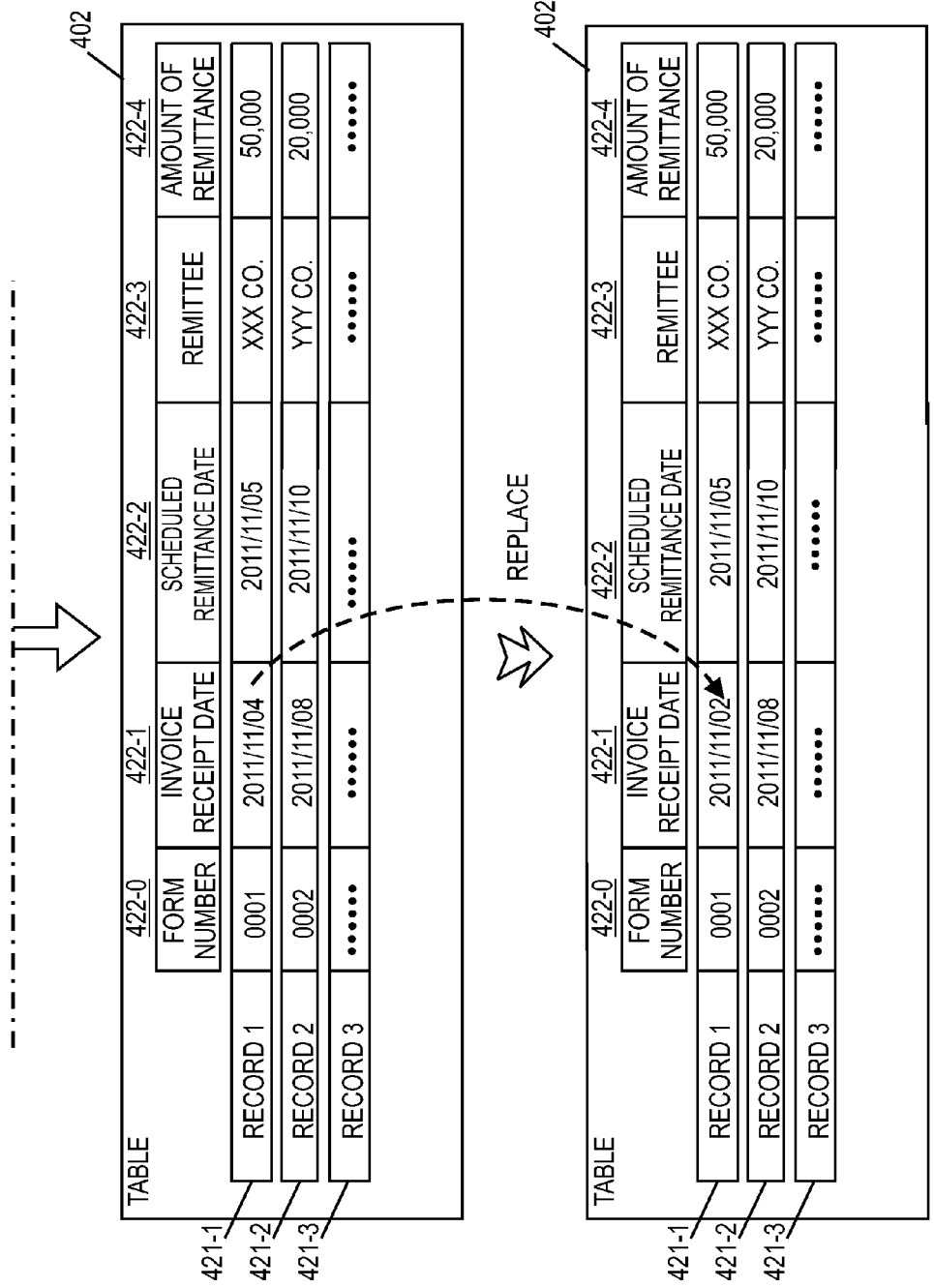
FIG. 5B is a diagram illustrating that information is further modified after the information is modified using the modification field in FIG. 5A.

FIG. 5B is a diagram illustrating that information is further modified after the information is modified using the modification field in FIG. 5A.

The paper form 401 illustrated in FIG. 5B is the same as the paper form 401 illustrated in FIG. 5A and accordingly the same as the paper form 361 illustrated in FIG. 3F.

Suppose that the user wants to further modify the information "2011/11/04" entered as information corresponding to the modification field name "1" to "2011/11/02". To make the modification, the user performs the following operations 1a) to 5a' with the digital pen 241.

1a' The user draws a strike-through, for example a cross, on the number "1" entered in the box 511 with the digital pen 241.

2a' Then the user draw a box 513 adjacent to or near the box 511 with the digital pen 241. The box 513 may be of any size that accommodates the number "2" for identifying a modification field name as described in the operation described below 3a'.

3a' Then the user writes the number "2" in the box 513 for identifying the modification field name with the digital pen 241.

4a' Then, if a region for entering a modification has not been drawn or entered beforehand in the modification field 502, the user performs the following operation. The user uses the digital pen 241 to draw a box 514 (a fourth region) near the modification field name "2" in the modification field 502. The box 514 may be of any size that accommodates the modification "2011/11/02" as described in operation 5a' below. On the other hand, if a modification entry region (a third region) associated with the modification field name "2" is printed beforehand in the modification field 502, the user proceeds to the next operation 5a'.

5a' Then the user writes a modification, "2011/11/02", in the box 514 with the digital pen 241.

As a result of the sequence of operations 1a' to 5a', the attribute value "2011/11/04" of attribute name 1 422-1 in record 1 421-1 in the table 402 which has been replaced by the method described with reference to FIG. 5A is further replaced with the entered value "2011/11/02".

The operations 1a' to 5a' for further modifying information using a modification field have been described from a user's point of view. A method for further modifying information using the modification field will be described in A1' to E1' below from the viewpoint of the apparatus 101 according to the present embodiment.

A1' In response to the operation 1a' performed by a user, the apparatus 101 acquires information from the digital pen 241 through the communication means 201 and detects, through the modification symbol detection means 213, that a cross, which is a modification symbol, has been added. Upon the detection, the apparatus 101 uses the identification means 203 to identify that the modification mark has been written in the box 511. The identification means 203 identifies the box 511 on the basis of information indicating the position on the physical medium 401 where the digital pen 241 was located at the time of the entry of the modification symbol.

B1' In response to the operation 2a' performed by the user, the apparatus 101 acquires information from the digital pen 241 through the communication means 201 and uses the entry information detection means 211 and the OCR means/position information detection means 212 to detect that a box 513 has been drawn. Since the box 513 was detected following the addition of the modification symbol, the apparatus 101 recognizes that the box 513 is a region provided for entering a modification field name 364.

C1' In response to the operation 3a' performed by the user, the apparatus 101 uses the entry information detection means 211 and the OCR means/position information detection means 212 to identify the number "2" entered in the box 513. If a region for modification entry (a third region) is printed beforehand in the modification field 502, the apparatus 101 associates the box 513 (the fourth region) indirectly with the first region 412-1 through the box 511 (the fourth region) or directly with the first region 412-1.

D1' In response to the operation 4a' performed by the user, the apparatus uses the identification means 203 to associate the box 514 (the fourth region) indirectly with the first region 412-1 through the box 511 or directly with the first region 412-1.

E1' Upon entry of the modification "2011/11/02" into the box 514 by the operation 5a' performed by the user, the replacement means 204 uses the entry information detection means 211 and the OCR means/position information detection means 212 to clear the field name 432-100 (not shown) "Invoice Receipt Date" in record 1 431-1 in the paper form position data 403 and enters the field name "Invoice Receipt Date" into a field name 432-2 in a record (for example record 101 (not shown)) provided beforehand for storing physical position data of a modification entry region (a third region) associated with modification field name "2". The apparatus 101 also uses the entry information detection means 211 and the OCR means/position information detection means 212 to convert the information written in the box 514 to text. Then the replacement means 294 replaces the attribute value "2011/11/04" of attribute name 1 422-1 in record 1 421-1 in the table 402 with that text, "2011/11/02".

Figures 2, 6A:
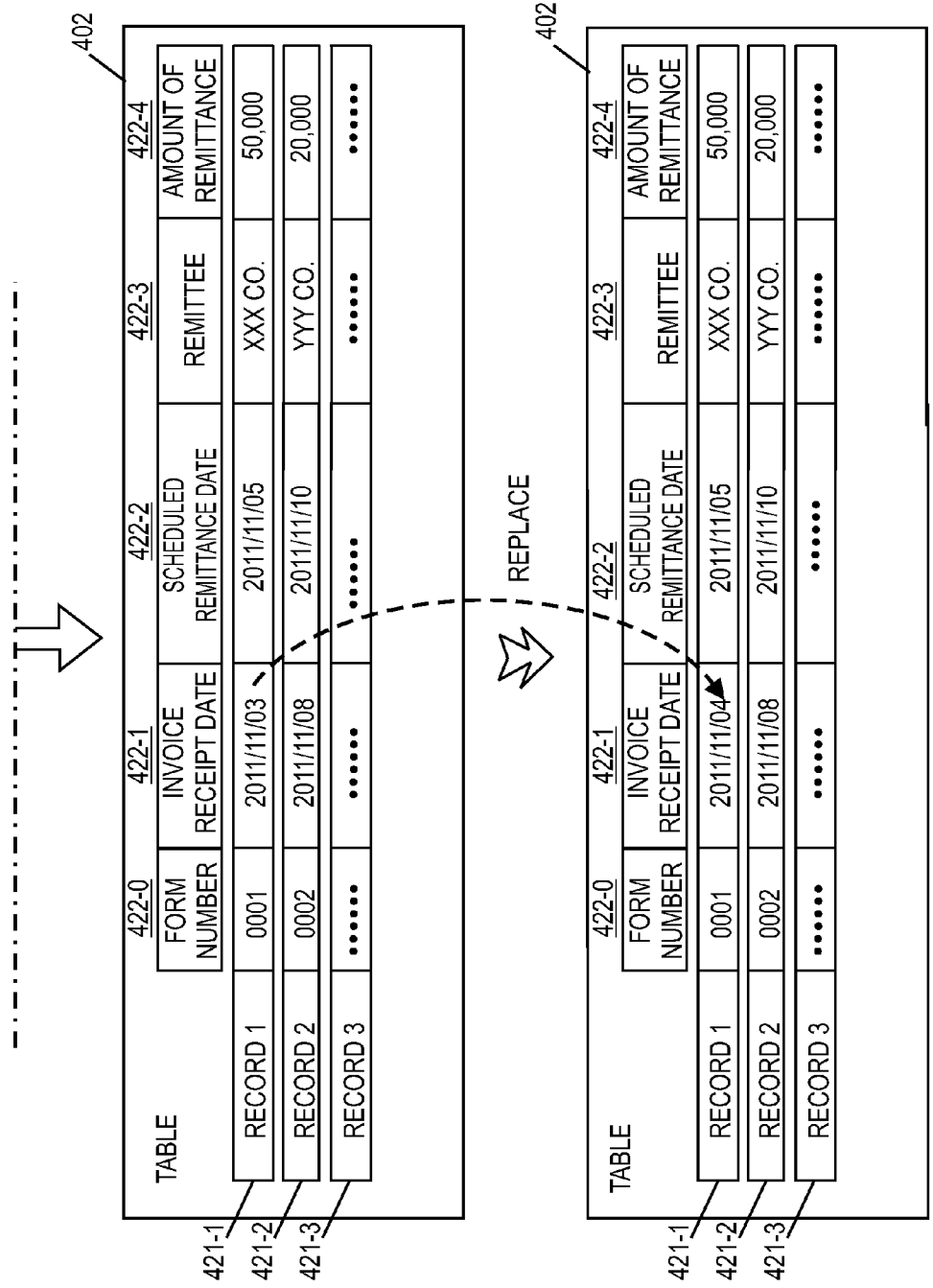
FIG. 6A is a diagram illustrating that a region (hereinafter also referred to as a modification region) used for changing an attribute value of a region where a modification is to be made is drawn on a physical medium and the modification region is used to modify information according to one embodiment.

FIG. 6A is a diagram illustrating that a region (a modification region) used for changing an attribute value of a region where modification is to be made is drawn on a physical medium and the region is used to modify information.

The paper form 401 illustrated in FIG. 6A is the same as the paper form 371 illustrated in FIG. 3F. The paper form 401 includes a predetermined field 601 but does not include a modification field. Intermediary means 231 is attached to the paper form 401.

Suppose that the user wants to modify the information "2011/11/03" entered as information corresponding to the item field name "Invoice Receipt Date" to "2011/11/04". In order to accomplish the modification, the user performs operations (1b) to (4b) described below with the digital pen 241.

(1b) The user uses the digital pen 241 to draw a strike-through, for example a double line "=" on "2011/11/03" or in a first region 412-1 in which "2011/11/03" is entered.

(2b) Then the user draws a box 611 (a fifth region), which is a region for adding a modification, in a blank region (where nothing is entered) in the predetermined field 601 with the digital pen 241. The box 611 may be of any size that accommodates the modification "2011/11/04" in the operation 3b described below. Accordingly, the blank region may be anywhere on the physical medium where the box 611 can be drawn. In terms of identifiability of a modification on the paper form 401, however, it is preferable that the box 611 be written in a location where the user can readily identify the modification at a later check on the paper form 401.

(3b) Then the user writes the modification "2011/11/04" in the box 611 with the digital pen 241.

(4b) The user then draws a line 612 from inside the first region 601 into the box 611 with the digital pen 241. The line is preferably a solid line. Alternatively, the user may draw a line from inside the box 611 into the first region 601 with the digital pen 241. In response to the drawing of the line 612, the box 611 can be associated with the first region 601. The association can be accomplished by changing the coordinate values (the X origin, X endpoint, Y origin and Y endpoint) of attribute name 1 in record 1 in the paper form data 403 illustrated in FIG. 4C from the coordinate values of the first region to the coordinate values of the box 611.

The order of the operations 3b and 4b may be changed. That is, the user draws a line 612 from inside the first region 601 into the box 611 with the digital pen 241. Accordingly the origin of the line 612 is in the first region 601 and the endpoint of the line 612 is in the box 611. Alternatively, the user can draw a line 612 from inside the first region 601 into the box 611 with the digital pen 241. In that case, the apparatus 101 replaces (the coordinates of) the endpoint of the line in the box 611 with (the coordinates of) the origin of the line 612 and replaces (the coordinates of) the origin of the line in the first region 601 with (the coordinates of) the endpoint of the line 612. Then the user writes a modification, "2011/11/04", in the box 611 with the digital pen 241.

As a result of the sequence of operations 1b to 4b described above, the initially entered attribute value "2011/11/03" of attribute name 1 422-1 in record 1 421-1 in the table 402 is replaced with "2011/11/04" just entered.

The operations 1b to 4b for modifying information without using the modification field illustrated in FIG. 5A have been described from a user's point of view. A method for modifying information using a modification field will be described in (A2) to (D2) given below from the viewpoint of the apparatus 101 according to the present embodiment (see also flowcharts in FIGS. 9A and 9B).

(A2) In response to the operation 1b performed by a user, the apparatus 101 acquires information from the digital pen 241 through the communication means 201 and uses the modification symbol detection means 213 to detect that a double line, which is a modification symbol, has been added. Upon the detection, the apparatus 101 uses the identification means 203 to identify an item field name among the item field names "Invoice Receipt Date", "Scheduled Remittance Date", "Remittee" and "Amount of Remittance" that is associated with a first region 412-1 to 412-4 in which the modification symbol has been added to information. The identification means 203 identifies the first region 412-1 associated with the item field name "Invoice Receipt Date" on the basis of information indicating the position on the physical medium 401 where the digital pen 241 was located at the time of the entry of the modification symbol.

(B2) In response to the operation 2b performed by the user, the apparatus 101 acquires information from the digital pen 241 through the communication means 201 and uses the entry information detection means 211 and the OCR means/position information detection means 212 to detect that a box 611 has been drawn. Since the box 611 was detected following the addition of the modification symbol, the apparatus recognizes that the box 611 is a region (a fifth region) for entering a modification.

(C2) In response to the operation 3b performed by the user, the apparatus 101 uses the entry information detection means 211 and the OCR means/position information detection means 212 to convert the characters "2011/11/04" written in the box 611 into text.

(D2) Upon drawing of the line 612 in response to the operation 4b performed by the user, the replacement means 204 uses the entry information detection means 211 and the OCR means/position information detection means 212 to replace the attribute values of the X origin 433-1, X endpoint 433-2, Y origin 433-3 and Y endpoint 433-4 in record 1 431-1 in the paper form position data 403 (that is, the attribute values which indicate the physical location of the first region 412-1 with the attribute values of the X origin 433-1, X endpoint 433-2, Y origin 433-3 and Y endpoint 433-4 of the box 611. The apparatus 101 uses the identification means 203 to associate the box 611 with the first region 412-1. Then the replacement means 204 replaces the attribute value "2011/11/03" of attribute name 1 422-1 in record 1 421-1 in the table 402 with the text "2011/11/04".

Figure 6B:
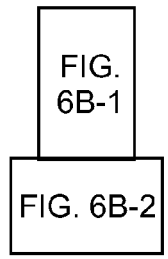
FIG. 6B is a diagram illustrating that information is further modified after the information is modified as illustrated in FIG. 6A.
Figures 1, 6B:
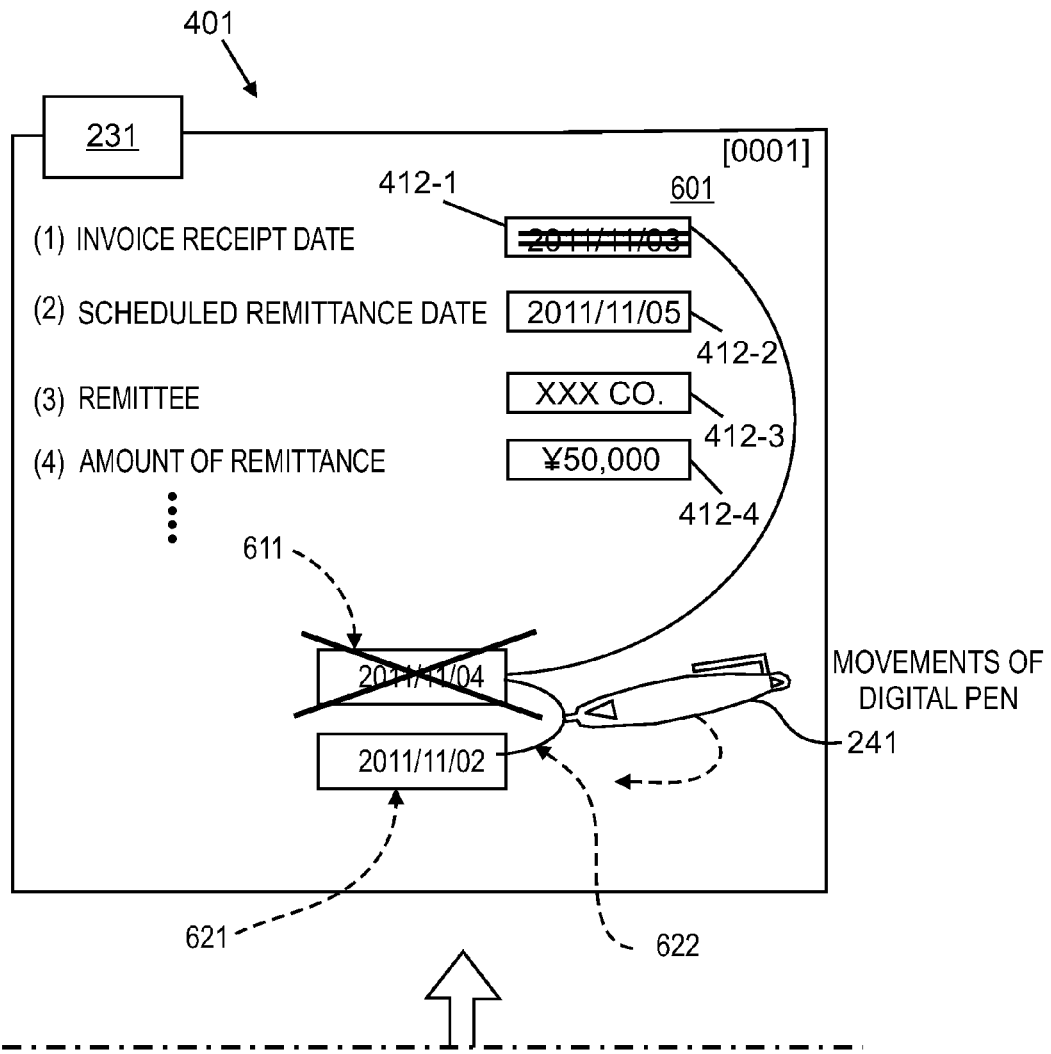

FIG. 6B is a diagram illustrating that after information is modified as illustrated in FIG. 6A, the information is further modified.

Suppose that the user wants to further modify the information "2011/11/04" in the box 611 to "2011/11/02". Following is a description of operations to be performed when a user wants to further modify information after the user draws on a physical medium a region (a modification region) used for changing an attribute value of a region where the modification is to be made and uses the modification region to modify the information. To make the further modification, the user can perform the following operations (1b') to (4b') with the digital pen 241.

(1b') The user draws a strike-through, for example a cross, on the characters "2011/11/04" entered in the box 611 or on the box 611 with the digital pen 241.

(2b') Then the user draws a box 621 (a fifth region) which is a region for making a modification, in a blank area in the predetermined field 601 with the digital pen 241. The box 621 is preferably drawn adjacent to or near the box 611 because thereby the user can readily recognize that the information in the box 611 has been remodified. The box 621 may be of any size that accommodates the modification "2011/11/02" in operation 3b' described below.

(3b') Then the user enters the modification "2011/11/02" in the box 621 with the digital pen 241.

(4b') The user then draws a line 622 from inside the box 611 into the box 621 with the digital pen 241. Alternatively, the user may draw a line from inside the box 621 into the box 611 with the digital pen 241.

The order of the operations (3b') and (4b') may be changed.

As a result of the sequence of the operations (1b') to (4b'), the attribute value of attribute name "1" 422-1 is changed from the modified value "2011/11/04" to the further modified value "2011/11/02".

The operations (1b') to (4b') for further modifying information using the modification region have been described with a user's point of view. The method for further modifying information will be described in the following (A2') to (D2') from the viewpoint of the apparatus 101 according to the present embodiment.

(A2') In response to the operation (1b') performed by a user, the apparatus 101 acquires information from the digital pen 241 through the communication means 201 and uses the modification symbol detection means 213 to detect that a cross, which is a modification symbol, has been added. Upon the detection, the apparatus 101 uses the identification means 203 to identify that a modification symbol has been added on a box. The identification means 203 identifies the box 511 on the basis of information indicating the position of the digital pen on the physical medium 401 at the time when the modification symbol was added.

(B2') In response to the operation 2b' performed by the user, the apparatus 101 acquires information from the digital pen 241 through the communication means 201 and uses the entry information detection means 211 and the OCR means/position information detection means 212 to detect that a box 621 has been drawn. Since the box 621 was detected following the addition of the modification symbol, the apparatus 101 recognizes that the box 621 is a region for entering a modification.

(C2') In response to the operation 3b' performed by the user, the apparatus 101 uses the entry information detection means 211 and the OCR means/position information detection means 212 to convert the characters "2011/11/02" into text.

(D2') Upon drawing of the line 612 in response to the operation 4b' performed by the user, the replacement means 204 uses the entry information detection means 211 and the OCR means/position information detection means 212 to replace the attribute values of the X origin 433-1, X endpoint 433-2, Y origin 433-3 and Y endpoint 433-4 in record 1 431-1 in the paper form position data 403 (that is, the attribute values which indicate the physical location of the box 611 with the attribute values of the X origin 433-1, X endpoint 433-2, Y origin 433-3 and Y endpoint 433-4 of the box 621. The apparatus 101 uses the identification means 203 to associate the box 621 indirectly with the first region 412-1 through the box 611 or directly with the first region 412-1. Then the replacement means 204 replaces the attribute value "2011/11/04" of attribute name 1 422-1 in record 1 421-1 in the table 402 with the text "2011/11/02".

Figures 2, 6C:
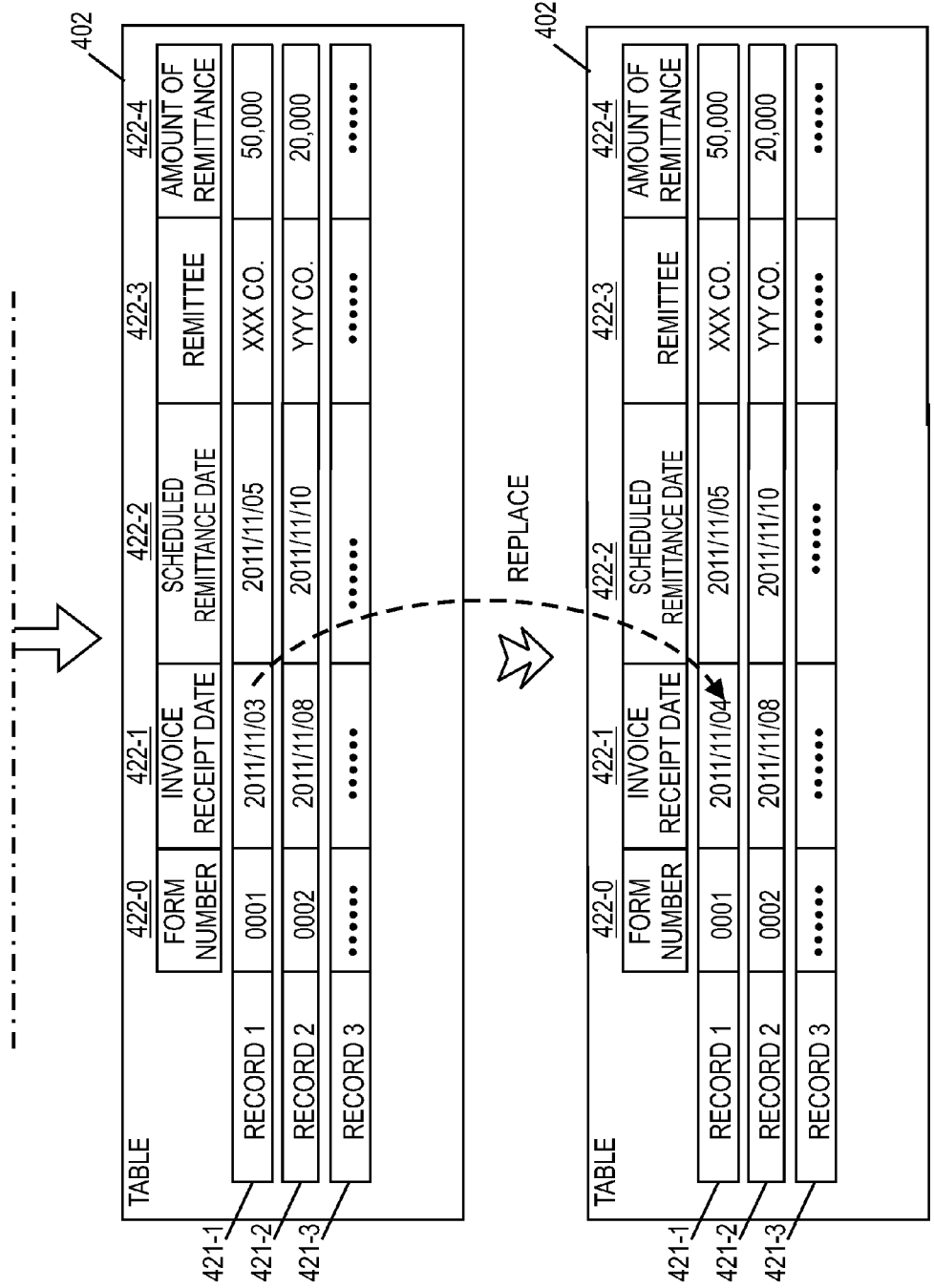
FIG. 6C is a diagram illustrating that a region (a modification region) used for changing an attribute value of a region where a modification is to be made is drawn on a physical medium and the modification region is used to modify information according to one embodiment.

FIG. 6C is a diagram illustrating that a region used for changing an attribute value of a region where a modification is to be made (a modification region) is drawn on a physical medium and information is modified using the modification region.

The paper form 401 illustrated in FIG. 6C is the same as the paper form 371 illustrated in FIG. 3F. The paper form 401 includes a predetermined field 631 but does not include a modification field. Intermediary means 231 is attached to the paper form 401.

Suppose that the user wants to modify the information "2011/11/03" entered as information corresponding to the item field name "Invoice Receipt Date" to "2011/11/04". To make the modification, the user performs the following operations (1c) to (3c) with the digital pen 241.

(1c) The user uses the digital pen 241 to draw a strikethrough, for example a double line "=", on "2011/11/03" or in the first region 412-1 in which "2011/11/03" is entered.

(2c) Then the user uses the digital pen 241 to enter a to-be-modified item field name (without a box) corresponding to the item field name for the first region to which the modification symbol has been added or a to-be-modified item field name region 641 for entering the to-be-modified item field name, and a box 642 which is a modification entry region associated with the to-be-modified item field name or the to-be-modified item field name region 641. If a to-be-modified item field name (without a box) is entered, the to-be-modified item field name and the box 642 can be disposed close to each other. If the to-be-modified item field name region 641 is entered, the box 642 can be disposed adjacent to or near the to-be-modified item field name region 641. If the apparatus 101 is set to assume by default that a region drawn on a left-hand side is a to-be-modified item field name region 641 and a region other than the left-hand side is a box 642, the box 642 can be disposed in any location other than to the left of the to-be-modified item field name region 641, such as above, below, to the right of, diagonally upward or downward to the right of the to-be-modified item field name region 641. The to-be-modified item field name region 641 and the box 642 may be of any sizes in which a to-be-modified item field name and a modification, "2011/11/04", respectively, can be written as described in the operation 3c below.

(3c) Then the user uses the digital pen 241 to write the to-be-modified item field name "1" associated with the first field containing the information to be modified and the modification "2011/11/04" in the to-be-modified item field name region 641 and the box 642, respectively. In response to the write of the modification in the sixth region, the box 642 is associated with the first region. The association can be accomplished by changing the coordinate values (the X origin, X endpoint, Y origin and Y endpoint) of attribute name 1 in record 1 in the paper form data 403 illustrated in FIG. 4C from the coordinate values of the first region to the coordinate values of the box 642.

In the operation (2c) described above, any of the to-be-modified item field name region 641 and the box 642 may be drawn first. That is, the user may first draw the to-be-modified item field name region 641 with the digital pen 241 and then draw the box 642 or first draw the box 642 and then the to-be-modified item field name region 641.

In the operation (3c) described above, any of the item field name "1" and the modification "2011/11/04" may be written first. That is, the user may first write the item field name "1" with the digital pen 241 and then the modification "2011/11/04" or first write the modification "2011/11/04" and then the item field name "1".

As a result of the sequence of operations (1c) to (3c) described above, the attribute value, "2011/11/03", of attribute name "1" 422-1 in record "1" 421-1 in the table 402 is replaced with "2011/11/04".

The operations (1c) to (3c) for modifying information without using the modification field illustrated in FIG. 5A have been described from a user's point of view. A method for modifying information using a modification field will be described in (A3) to (C3) below from the viewpoint of the apparatus 101 according to the present embodiment (See also the flowchart in FIG. 9C).

(A3) In response to a user's operation (1c) described above, the apparatus 101 acquires information from the digital pen 241 through the communication means 201 and uses the modification symbol detection means 213 to detect that a double line, which is a modification symbol, has been added. Upon the detection, the apparatus 101 uses the identification means 203 to identify an item field name among the item field names "Invoice Receipt Data", "Scheduled Remittance Date", "Remittee" and "Amount of Remittance" that is associated with a first region 412-1 to 412-4 in which the modification symbol has been added to information. The identification means 203 identifies the first region 412-1 associated with the item field name "Invoice Receipt Date" on the basis of information indicating the position on the physical medium 401 where the digital pen 241 was located at the time of the entry of the modification symbol.

(B3) In response to the operation (2c) performed by the user, the apparatus 101 acquires information from the digital pen 241 through the communication means 201 and uses the entry information detection means 211 and the OCR means/position information detection means 212 to detect that a to-be-modified item field name region 641 and a box 642 have been drawn. Since the to-be-modified item field name region 641 and the box 642 were detected following the addition of the modification symbol, the apparatus 101 recognizes that the to-be-modified item field name region 641 is a region where a to-be-modified item field name is to be written and the box 642 is a region (a sixth region) for entering a modification. In response to the operation (2c) performed by the user, the replacement means 204 uses the entry information detection means 211 and the OCR means/position information detection means 212 to replace the attribute values of the X origin 433-1, X endpoint 433-2, Y origin 433-3 and Y endpoint 433-4 in record 1 431-1 in the paper form position data 403 (that is, the attribute values indicting the physical location of the first region 412-1 with the attribute values of the X origin 433-1, X endpoint 433-2, Y origin 433-3 and Y endpoint 433-4 of the box 621.

(C3) In response to the operation (3c) performed by the user, the apparatus 101 uses the entry information detection means 211 and the OCR means/position information detection means 212 to convert the number "1" written in the to-be-modified item field name region 641 and the date "2011/11/04" written in the box 642 into text. Then the apparatus 101 uses the identification means 203 to associate the box 642 with the first region 412-1. Then the apparatus 101 uses the replacement means 204 to replace the attribute value "2011/11/03" of attribute name 1 442-1 in record 1 421-1 in the table 402 with the text "2011/11/04".

Figure 6D:
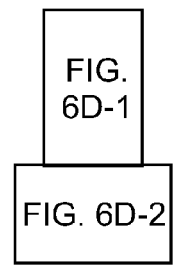
FIG. 6D is a diagram illustrating that information is further modified after the information is modified as illustrated in FIG. 6C.
Figures 1, 6D:
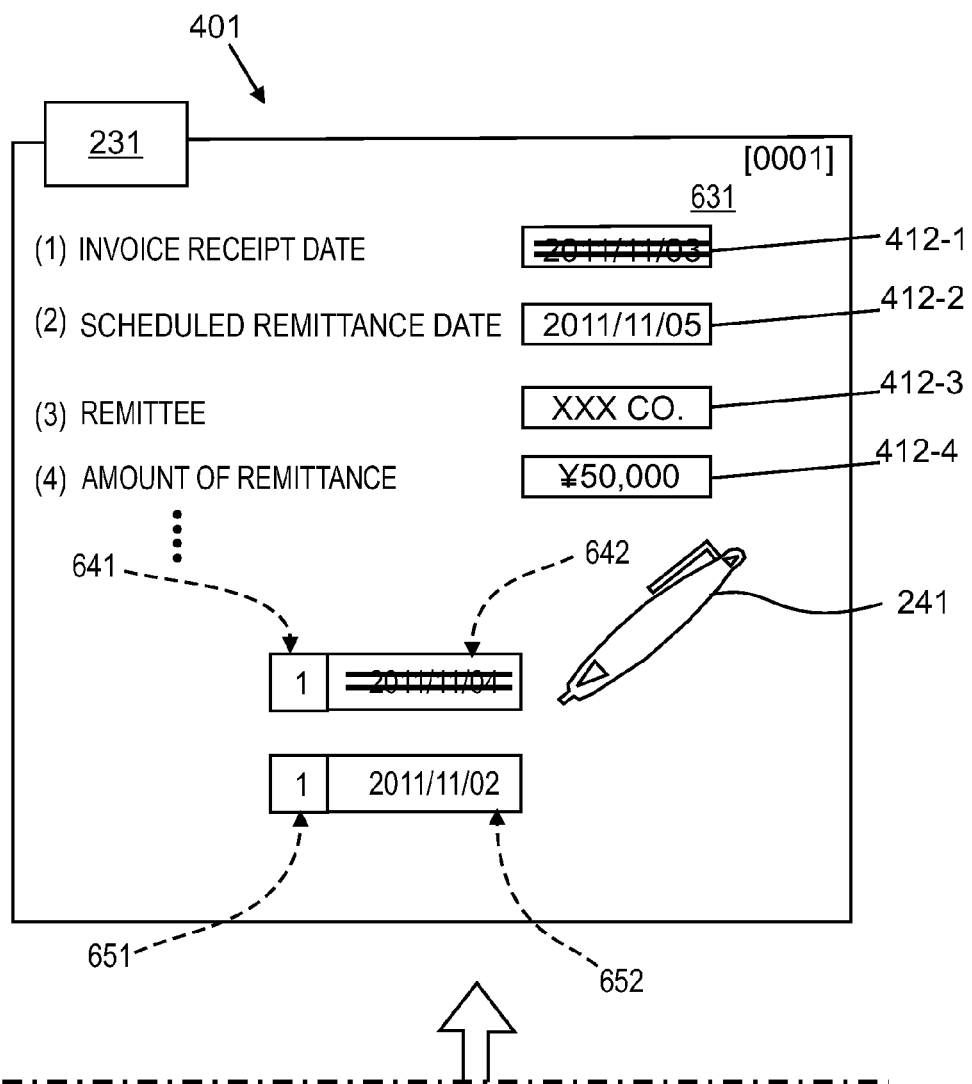
Figures 2, 6D:
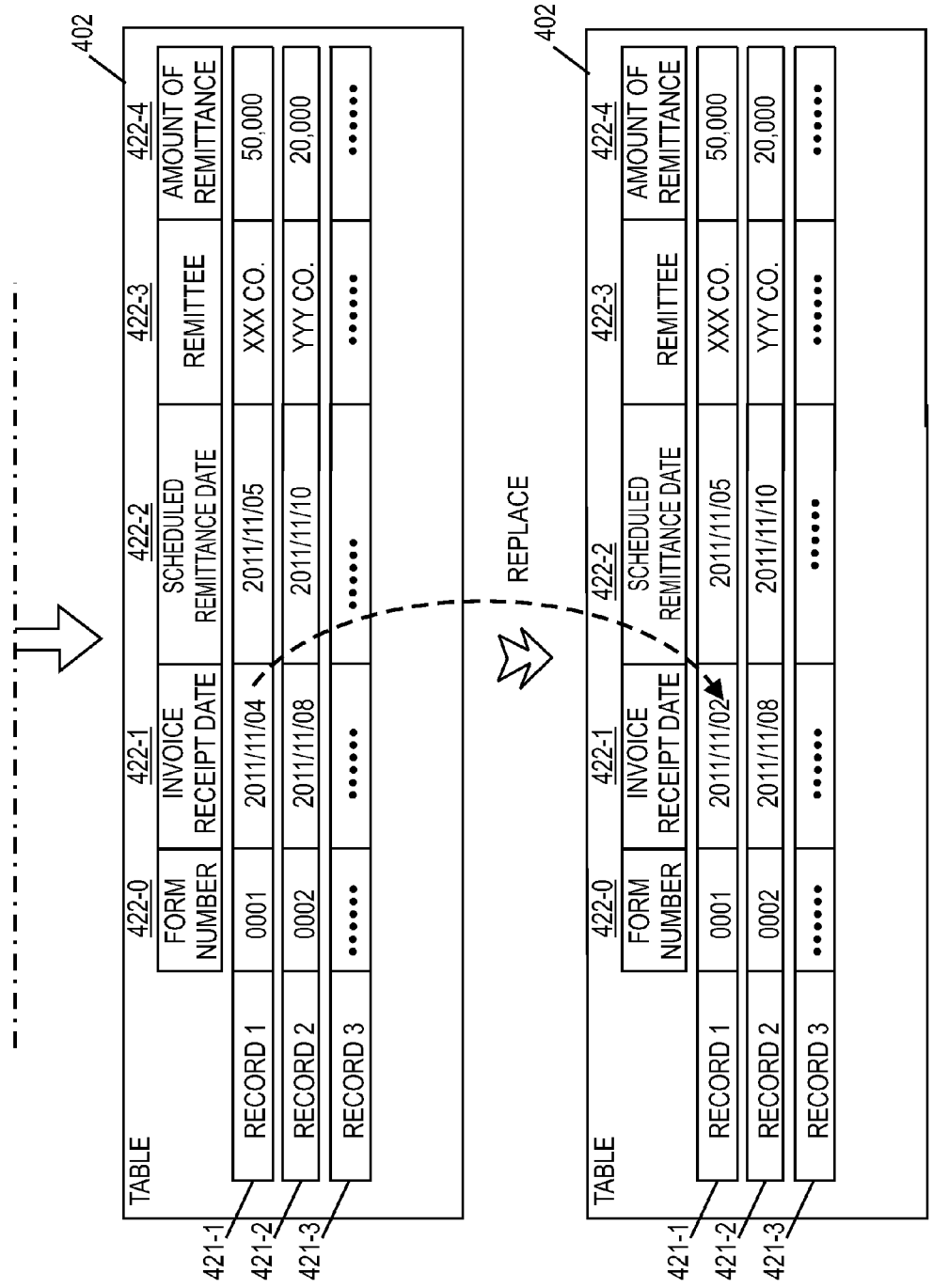

FIG. 6D is a diagram illustrating that after the information is modified as illustrated in FIG. 6C, the modified information is further modified.

Suppose that the user wants to further modify the information "2011/11/03" entered in the box 642 to "2011/11/02". Following is a description of operations to be performed when a user wants to further modify information after the user draws on a physical medium a region (a modification region) used for changing an attribute value of a region where the modification is to be made and uses the modification region to modify the information. To make the further modification, the user can perform the following operations (1c') to (3c') with the digital pen 241.

(1c') The user uses the digital pen 241 to draw a strike-through, for example a double line, on the numeric characters "2011/11/04" written in the box 642.

(2c') Then the user uses the digital pen 241 to write a to-be-modified item field name (without a box) corresponding to the box 641 or draw a to-be-modified item field name region 651 for writing the to-be-modified item field name, and a box 652 (a sixth region) which is a modification entry region associated with the to-be-modified item field name or the to-be-modified item field name region 651. The to-be-modified item field name region 651 and the box 652 may be of any sizes in which a to-be-modified item field name and a modification, "2011/11/02", respectively, can be written as described in the operation 3c' below.

(3c') Then the user uses the digital pen 241 to write the to-be-modified item field name "1" associated with the first region containing information to be modified and the modification "2011/11/02" in the to-be-modified item field name region 651 and the box 652, respectively.

In the operation (2c') described above, any of the item-field-name-to-modified region 651 and the box 652 may be drawn first.

In the operation (3c') above, any of the item field name "1" and the modification "2011/11/02" may be written first.

As a result of the sequence of the operations 1c' to 3c', the modified attribute value "2011/11/04" of attribute name 1 422-1 in record 1 421-1 in the table 402 is replaced with the further modified value "2011/11/02".

The operations (1c') to (3c') for further modifying information using the modification field have been described from a user's point of view. A method for further modifying information using a modification field will be described in A3' to (C3') below from the viewpoint of the apparatus 101 according to the present embodiment.

(A3') In response to the operation (1c') performed by a user, the apparatus 101 acquires information from the digital pen 241 through the communication means 201 and uses the modification symbol detection means 213 to detect that a double line, which is a modification symbol, has been added. Upon the detection, the apparatus 101 uses the identification means 203 to identify that the modification symbol has been added on the box 642, on the basis of information indicating the position on the physical medium 401 where the digital pen 241 was located at the time of addition of the modification symbol.

(B3') In response to the operation (2c') performed by the user, the apparatus 101 acquires information from the digital pen 241 through the communication means 201 and uses the entry information detection means 211 and the OCR means/position information detection means 212 to detect that a to-be-modified item field name region 651 and a box 652 have been drawn. Since the to-be-modified item field name region 651 and the box 652 were detected following the addition of the modification symbol, the apparatus 101 recognizes that the to-be-modified item field name region 651 is a region where a to-be-modified item field name is to be written and the box 652 is a region (a sixth region) for entering a modification. In response to the operation 2c performed by the user, the replacement means 204 uses the entry information detection means 211 and the OCR means/position information detection means 212 to replace the attribute values of the X origin 433-1, X endpoint 433-2, Y origin 433-3 and Y endpoint 433-4 in record 1 431-1 in the paper form position data 403 (that is, the attribute values indicting the physical location of the box 642 with the attribute values of the X origin 433-1, X endpoint 433-2, Y origin 433-3 and Y endpoint 433-4 of the box 652.

(C3') In response to the operation (3c') performed by the user, the apparatus 101 uses the entry information detection means 211 and the OCR means/position information detection means 212 to convert the number "1" written in the to-be-modified item field name region 651 and the date "2011/11/02" written in the box 652 into text. Since the number written in the to-be-modified item field name region 651 is "1", the apparatus 101 uses the identification means 203 to associate the box 652 with the first region 412-1 directly or indirectly through the box 642. Then the apparatus 101 uses the replacement means 204 to replace the attribute value "2011/11/04" of attribute name 1 422-1 in record 1 421-1 in the table 402 with the text "2011/11/02".

Figure 7A:
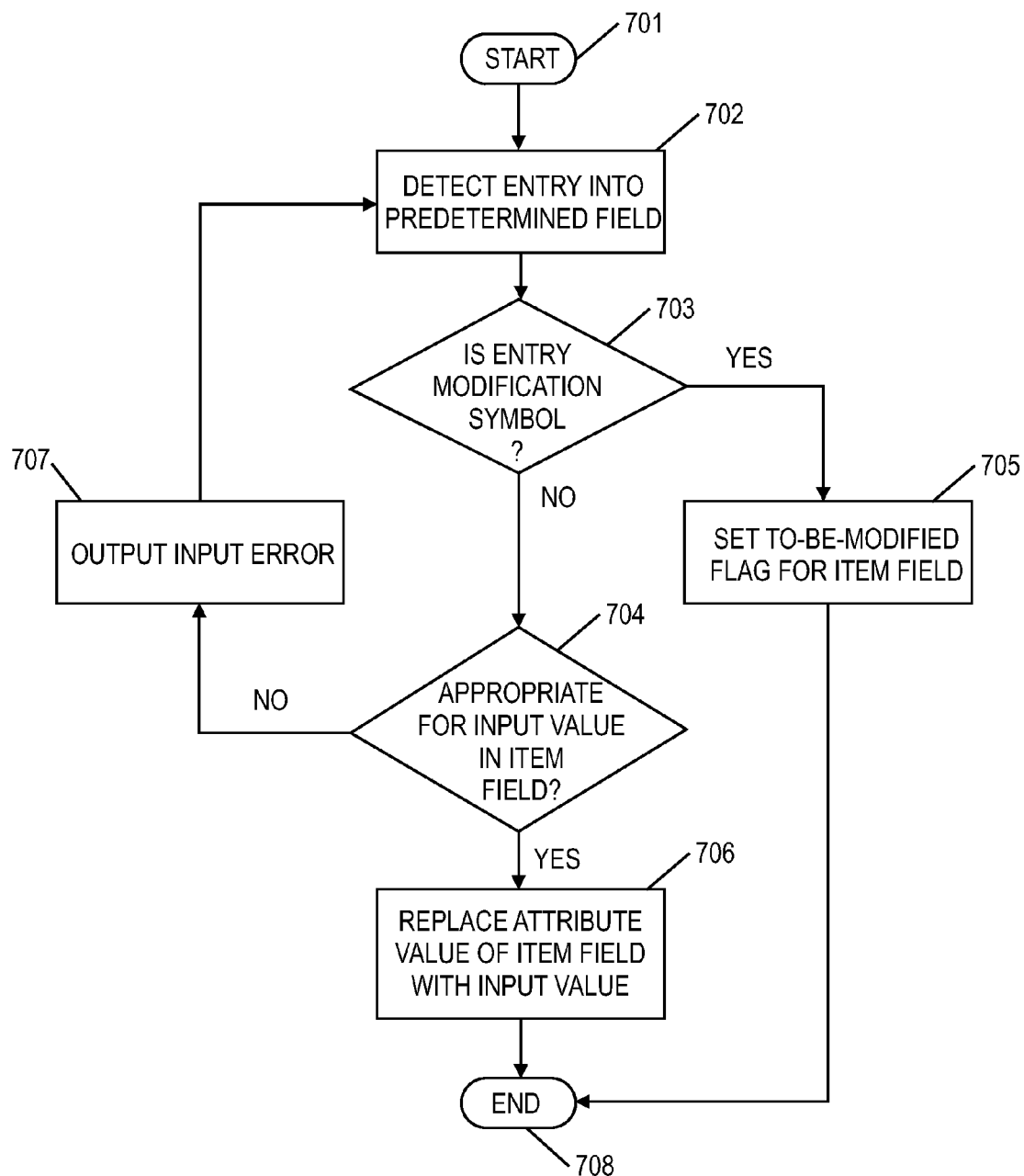
FIG. 7A illustrates a basic flowchart of a process that can be used in one embodiment of the present embodiment for assisting input using a digital pen and detecting a modification symbol written with the digital pen.

FIG. 7A is a basic flowchart of a process for assisting input with a digital pen and detecting a modification symbol written with the digital pen that can be used in one mode of embodiments of the present embodiment.

At step 701, the apparatus starts the process for assisting input with a digital pen 241 and detecting a modification symbol.

At step 702, the detection means 202 starts receiving information written with the digital pen 241 through the communication means 201 and detects writing by a user in a predetermined field on a physical medium with the digital pen 241.

At step 703, the detection means 202 uses the entry information detection means and the OCR means/position information detection means 212 to detect whether the entry detected at step 702 is a modification symbol or other object (a character or numeric or other object such as a graphic, for example a box). In response to detecting that the entry is not a modification symbol, the detection means 202 forwards the process to step 704. On the other hand, in response to detecting that the entry is a modification symbol, the detection means 202 forwards the process to step 705.

At step 704, in response to the determination that the entry detected at step 702 is not a modification symbol, the identification means 203 determines whether or not the entry or a value corresponding to the entry (hereinafter also referred to as an attribute value) is appropriate for an input value in the item field. For example, the identification means 203 may determine that an attribute value is appropriate for an input value if the item field is "Date" and the attribute value represents a birth date; on the other hand, if the attribute value does not represent a birth date, the identification means 203 may determine that the attribute value is not appropriate for an input value. In response to the determination that the attribute value is appropriate for an input value in the item field, the identification means 203 forwards the process to step 706. On the other hand, in response to the determination that the attribute value is not appropriate for an input in the item field, the identification means forwards the process to step 707.

At step 706, in response to the determination that the attribute value is appropriate for an input value in the item field, the replacement means 205 replaces the attribute value of the item field in which the attribute value has been written in a temporary table 214 in the memory 205 or in a database 224 in the storage device with the attribute value determined to be appropriate. If the item field is initially filled in, an attribute value, null, is replaced with the attribute value determined to be appropriate.

At step 708, the apparatus 101 ends reception of information written with the digital pen 241. Alternatively, the apparatus 101 may forward the process to step 702 and wait until the next writing is detected.

At step 705, in response to the determination that the entry detected at step 702 is a modification symbol, the identification means 203 sets a to-be-modified flag for the item field in which the modification symbol has been entered. Furthermore, in response to the determination that the entry detected at step 702 is a modification symbol, the identification means 203 generates a trigger for starting any of the processes of flowcharts illustrated in FIG. 8, FIGS. 9A and 9B, and FIG. 9C. The identification means 203 may clear the attribute value of the item field (to null) while at the same time setting the to-be-modified flag.

At step 707, in response to the determination that the entry detected at step 702 is not appropriate for an input value in the item field, the identification means 203 outputs an input error and returns the process to step 702. The output of the input error can be notified to the user by a message displayed on a display connected to the apparatus 101 or a display provided on the intermediary means 231, or by a sound from a speaker provided in the apparatus 101 or in the intermediary means 231, or a vibration facility provided in the digital pen 241. By returning the process to step 702, the identification means 203 can continue treating an entry detected at step 702 as an inappropriate character string until a modification symbol is input.

Figure 7B:
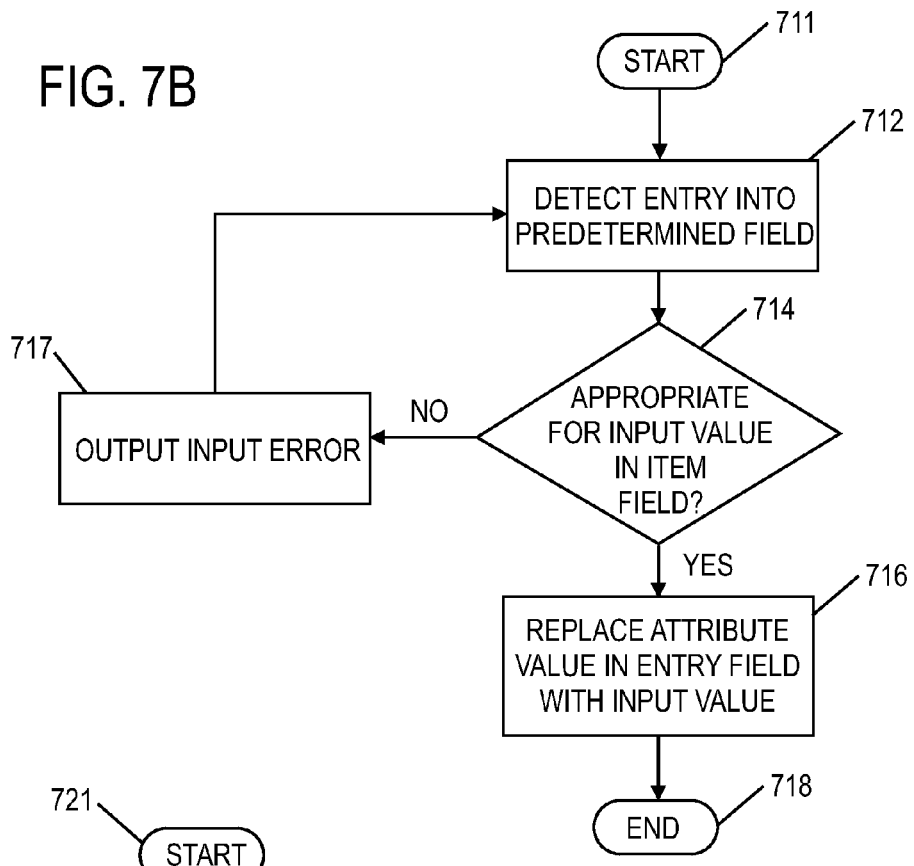
FIG. 7B illustrates a flowchart of the process for assisting input using the digital pen, extracted from the basis flowchart in FIG. 7A.

FIG. 7B is a flowchart of a process for assisting input using the digital pen, extracted from the basis flowchart in FIG. 7A.

Steps 711, 712, 714, 716, 717 and 718 correspond to steps 701, 702, 704, 706, 707 and 718, respectively, of FIG. 7A. See the description of steps 701, 702, 704, 706, 707 and 718 of FIG. 7A provided above for the description of steps 711, 712, 714, 716, 717 and 718. In FIG. 7A, a user entry made with the digital pen 241 is detected at step 702 and then determination is made at step 703 as to whether what was entered and detected at step 702 is a modification symbol or not. In FIG. 7B, on the other hand, a user entry made with the digital pen 241 is detected at step 712 and then determination is made at step 714 as to whether what was entered and detected at step 712 is appropriate for an input in the item field.

Figure 7C:
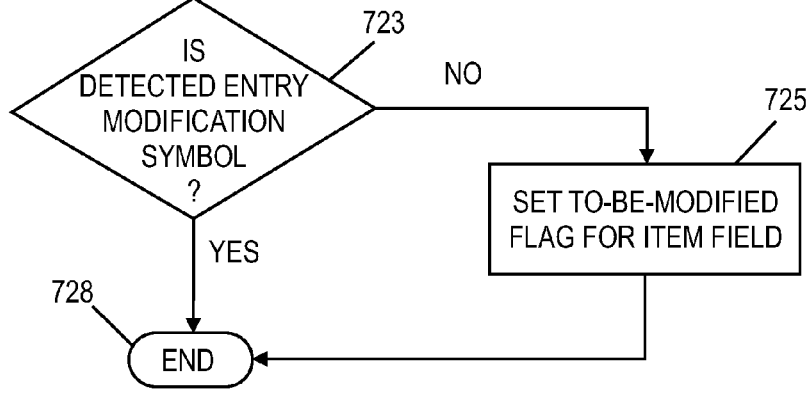
FIG. 7C illustrates a flowchart of a process for detecting a modification symbol written with the digital pen, extracted from the basic flowchart in FIG. 7A.

FIG. 7C is a flowchart of the process for detecting a modification symbol, extracted from the basic flowchart in FIG. 7A.

Steps 721, 722, 723 725 and 728 correspond to steps 701, 702, 703, 705 and 708, respectively, of FIG. 7A. See the description of steps 701, 702, 703, 705 and 708 of FIG. 7A provided above for the description of steps 721, 722, 723, 725 and 728.

Figure 8:
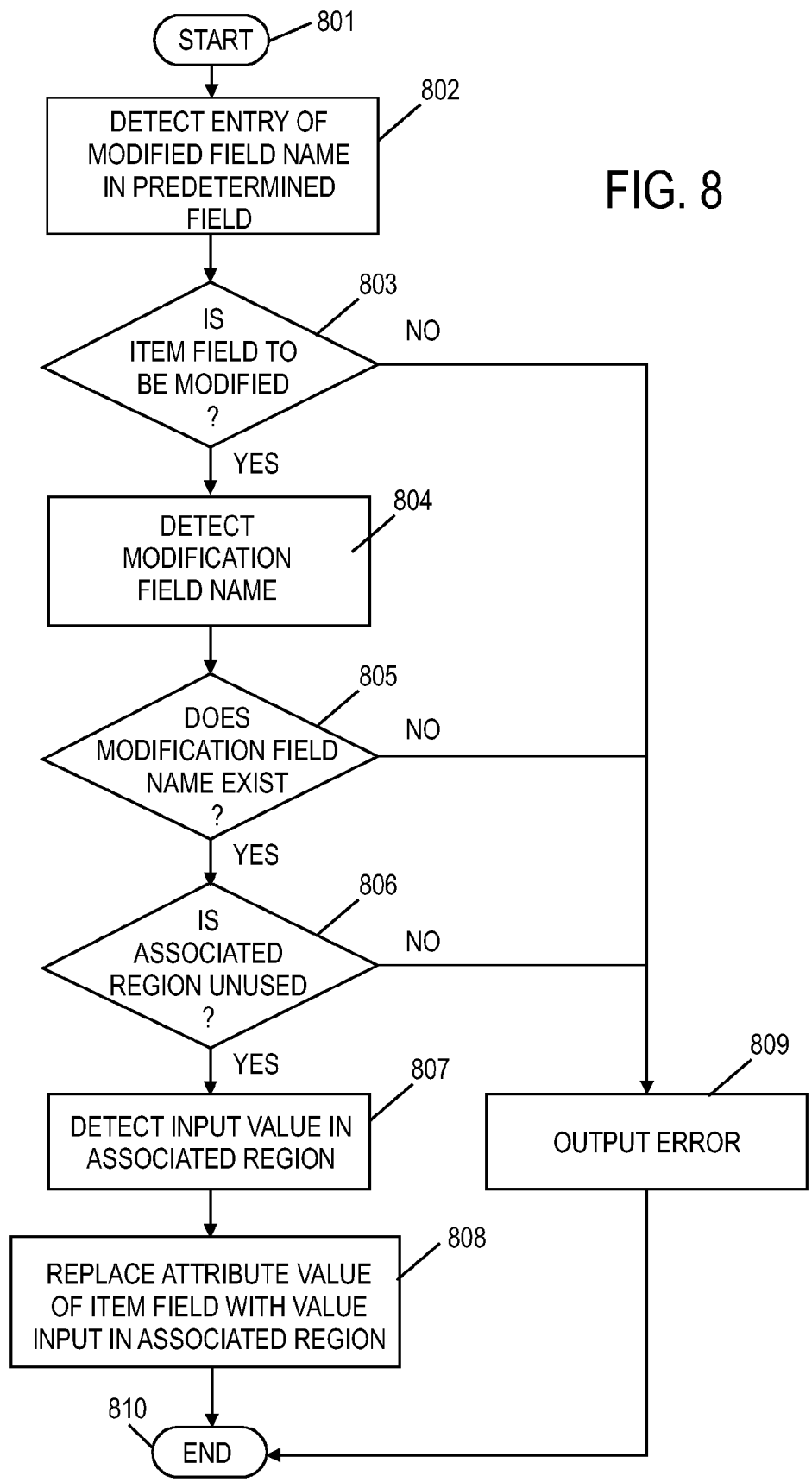
FIG. 8 illustrates a flowchart for modifying information using a modification field according to one embodiment.

FIG. 8 is a flowchart for modifying information using a modification field according to one embodiment of the present embodiment.

At step 801, the apparatus 101 starts a process for modifying information using a modification field. A physical medium used in the process may be the paper form (401) illustrated in FIG. 5A, for example.

At step 802, the detection means 202 detects on the basis of information acquired from the digital pen 241 that a modification field name written in a modification field has been entered in a predetermined field.

At step 803, the identification means 203 checks to see whether an item field is to be modified or not. The check can be made by checking whether or not a to-be-modified flag is set for the item field of interest (see step 705 of FIG. 7A). In response to the determination that the item field is to be modified, the identification means 203 forwards the process to step 804. On the other hand, in response to the determination that the item field is not to be modified, the identification means 203 forwards the process to step 809 for outputting an error.

At step 804, the entry information detection means 211 and the OCR means/position information detection means 212 convert the modification field name entered in the predetermined field into text on the basis of information acquired from the digital pen 241.

At step 805, the identification means 203 checks to see whether the modification field name detected at step 804 exists in the modification field on the physical medium. The check can be made by determining whether or not the detected modification field name is contained in the paper form position data 403 or the table 402 illustrated in FIG. 4C. In response the determination that the detected modification field name exists in the modification field, the identification means 203 forwards the process to step 806. On the other hand, in response to the determination that the detected modification field name does not exist in the modification field, the identification means 203 forwards the process to step 809 for outputting an error.

At step 806, in response to the determination that the detected modification field name exists in the modification field, the identification means 203 checks to see whether a region for information entry (a third or fourth region) associated with the detected modification field name is unused. The check can be made by determining whether or not an attribute value associated with the detected modification field name is contained in the paper form position data 403 or the table 402 illustrated in FIG. 4C. In response to the determination that the region is unused, the identification means 203 forwards the process to step 807. On the other hand, in response to the determination that the region is not unused, that is, the region is already used, the identification means 203 forwards the process to step 809 for outputting an error.

At step 807, the entry information detection means 211 and the OCR means/position information detection means 212 convert, on the basis of information acquired from the digital pen 214, the input value entered in the information entry region associated with the detected modification field name into text.

At step 808, the replacement means 204 replaces the attribute value of the item field to be modified in the memory or the storage device with the input value in the region described above.

At step 809, in response to the determination at step 803 that the item field is not to be modified, or in response to the determination at step 805 that the detected modification field name does not exist in the modification field, or in response to the determination at step 806 that the region is not unused, the identification means 203 outputs an error indicating that the modification cannot be made. The output of the error can be notified to the user by a message displayed on a display connected to the apparatus 101 or a display provided on the intermediary means 231, or by a sound from a speaker provided in the apparatus 101 or in the intermediary means 231, or a vibration facility provided in the digital pen 241.

At step 810, the apparatus 101 ends the process for modifying information using the modification field. Upon the end of the process, the apparatus 101 can forward the process to step 702 of FIG. 7A and can wait until the next entry is detected.

Figure 9A:
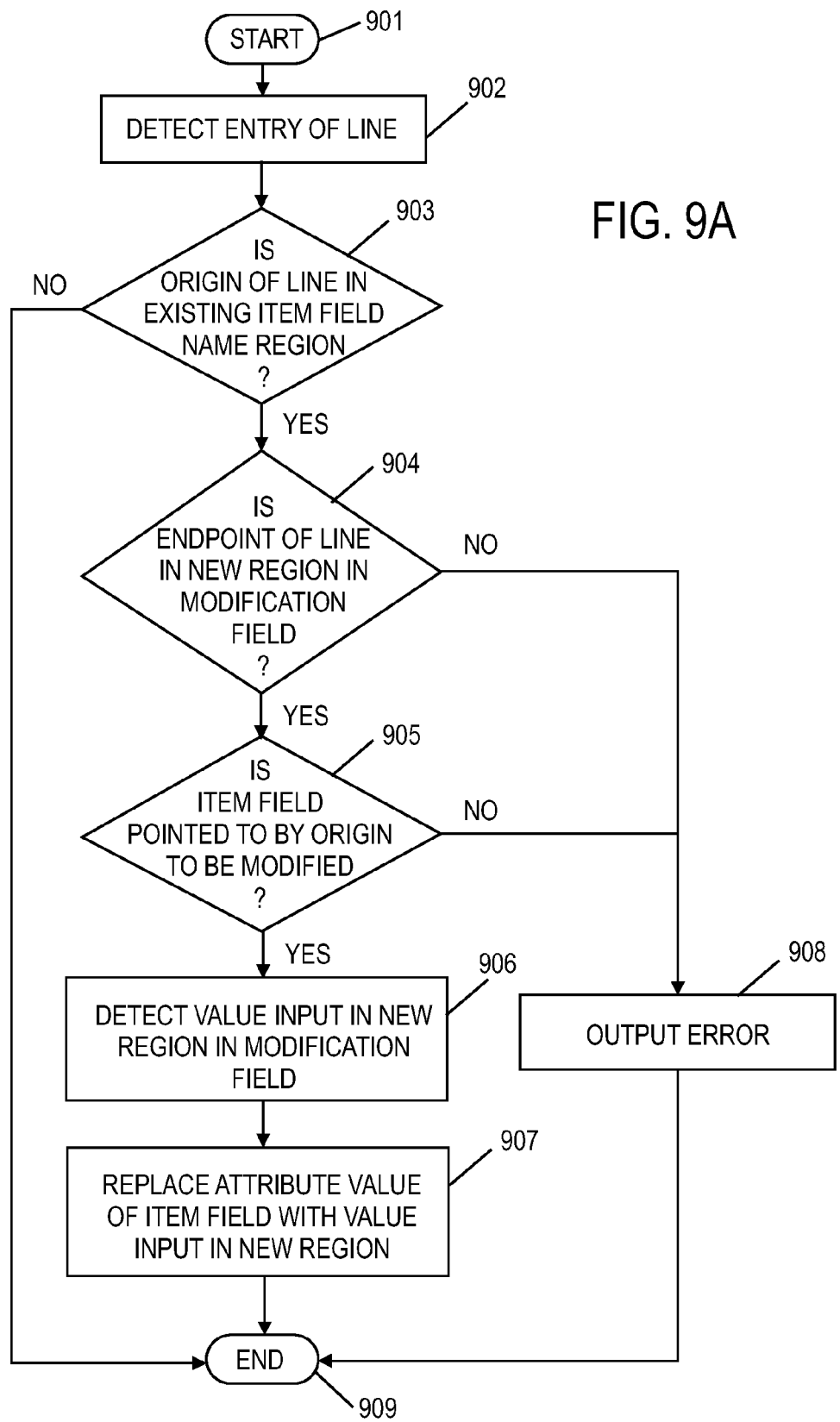
FIG. 9A illustrates a flowchart for drawing a region (a modification region) used for modifying an attribute value of a region where a modification is to be made on a physical medium and modifying information using the modification region according to one embodiment.

FIG. 9A is a flowchart for drawing on a physical medium a region (a modification region) used for changing an attribute value of a region where a modification is to be made and modifying information using the modification region according to one embodiment of the present embodiment.

At step 902, the detection means 202 detects that a line is drawn in a predetermined field, on the basis of information acquired from the digital pen 241.

At step 903, the identification means 203 determines whether or not the origin of the detected line (a position on the physical medium) is in an existing item field name region (a first region). The determination can be made by referring to the paper form position data 403 illustrated in FIG. 4C. In response to the determination that the origin of the detected line is in an existing item field name region, the identification means 203 forwards the process to step 904. On the other hand, in response to the determination that the origin of the detected line is not in an existing item field name region, the identification means 203 forwards the process to step 909.

At step 904, in response to the determination that the origin of the detected line is in an existing item field name region, the identification means 203 determines whether or not the endpoint of the detected line (a position on the physical medium) is in an information entry region newly provided in the modification field (which is equivalent to a fifth region in the claims). The determination can be made by referring to the paper form position data 403 illustrated in FIG. 4C. In response to the determination that the endpoint of the detected line is in an information entry region newly provided in the modification field, the identification means 203 forwards the process to step 905. On the other hand, in response to the determination that the endpoint of the detected line is not in an information entry region newly provided in the modification field, the identification means 203 forwards the process to step 908 for outputting an error.

At step 905, in response to the determination that the endpoint of the detected line is in an information entry region newly provided in the modification field, the identification means 203 determines whether or not the attribute value of the item field pointed to by the origin of the detected line is to be modified. The determination can be made by determining whether or not a to-be-modified flag is set for the item field of interest (see step 705 of FIG. 7A). In response to the determination that the attribute value of the item field name region pointed to by the origin of the detected line is to be modified, the identification means 203 forwards the process to step 906. On the other hand, in response to the determination that the attribute value of the item field name region pointed to by the origin of the detected line is not to be modified, the identification means 203 forwards the process to step 908 for outputting an error.

At step 906, the entry information detection means 211 and the OCR means/position information detection means 212 convert the input value in the information entry region newly provided in the modification field into text.

At step 907, the replacement means 205 replaces the attribute value of the item field name region where the modification is to be made in the table stored in the memory or the storage device with the input value in the region described above.

At step 908, in response to the determination that the endpoint of the detected line is not in the information entry region newly provided in the modification field at step 904, or in response to the determination that the attribute value of the item field name region pointed to by the origin of the detected line is not to be modified at step 905, the identification means 203 outputs an error indicating that the modification cannot be made. The output of the error can be notified to the user by a message displayed on a display connected to the apparatus 101 or a display provided on the intermediary means 231, or by a sound from a speaker provided in the apparatus 101 or in the intermediary means 231, or a vibration facility provided in the digital pen 241.

At step 909, the apparatus 101 ends the process for modifying information using the modification region. Upon the end of the process, the apparatus 101 can forward the process to step 702 of FIG. 7A and wait until the next entry is detected.

FIG. 9B is a flowchart relating to the flowchart of FIG. 9A and illustrating a process for defining a region for information entry as a region newly provided in a modification field.

At step 911, the apparatus 101 starts the region defining process.

At step 912, the detection means 202 detects on the basis of information acquired from the digital pen 241 that one box has been drawn.

At step 913, in response to the detection that the box has been drawn, the identification means 203 determines, as in step 904 of FIG. 9A, whether or not the endpoint of the line detected at step 902 (a position on the physical medium) is in an information entry region newly provided in the modification field (which is equivalent to the fifth region in the claims). In response to the determination that the endpoint of the detected line is in an information entry region newly provided in the modification field, the identification means 203 forwards the process to step 914. On the other hand, in response to the determination that the endpoint of the detected line is not in an information entry region newly provided in the modification field, the identification means 203 forwards the process to step 915.

At step 914, in response to the determination that the endpoint of the detected line is in the information entry region newly provided in the modification field, the identification means 203 defines the region at the endpoint of the detected line as a new region.

At step 915, the apparatus 101 ends the region defining process.

Figure 9C:
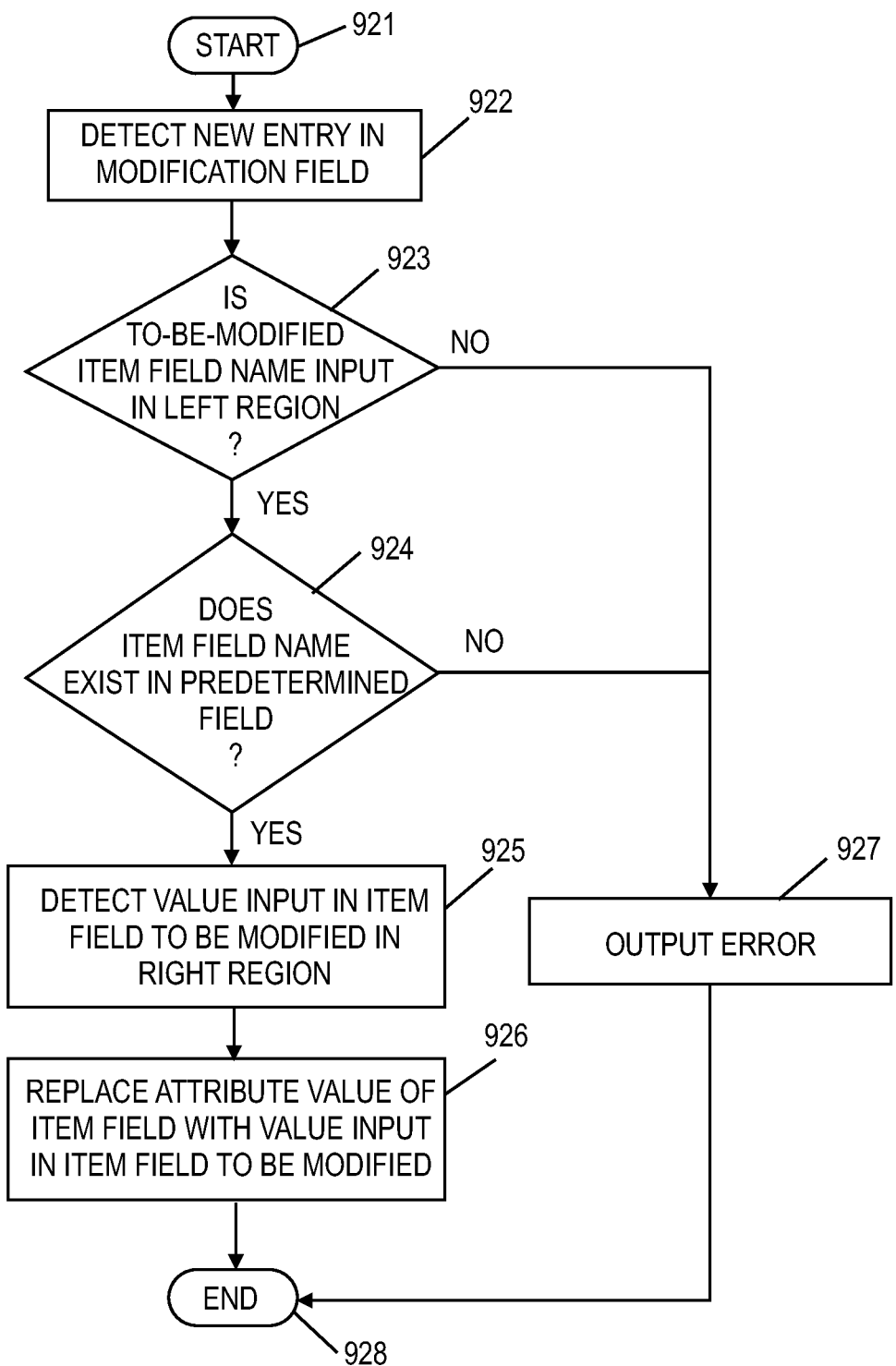
FIG. 9C illustrates a flowchart for entering, on a physical medium, a to-be-modified item field name which is a field name entered for identifying an item field name associated with a region where a modification is to be made and a region (a modification region) used for changing an attribute value of the region where the modification is to be made and modifying information using the to-be-modified item field name and the modification field.

FIG. 9C is a flowchart for entering, on a physical medium, a to-be-modified item field name and a region used for changing an attribute value of a region where a modification is to be made (a modification region) and modifying information using the to-be-modified item field name and the modification region.

At step 921, the apparatus 101 starts the process for modifying information using a to-be-modified item field name and a modification region.

At step 922, the detection means 202 detects on the basis of information acquired from the digital pen 241 that two boxes have been drawn adjacent to or near each other in the modification field. It is assumed in the following description that the two boxes are disposed side by side. The left-hand box is referred to as the left region and the right-hand box is referred to as the right region. The left region is used for writing a to-be-modified item field name, which is a field name written for identifying an item field name associated with a region where a modification is to be made (a first region). The right region is a region used for changing the attribute value of the region where a modification is to be made (the modification region) and is used for writing a changed attribute value.

At step 923, the identification means 203 determines, on the basis of information acquired from the digital pen 241, whether or not a to-be-modified item field name has been written in the left region. The determination can be made on the basis of positions on the physical medium in which the digital pen 241 is located during the writing of the item field name. In response to the determination that a to-be-modified item field name is written in the left region, the identification means 203 forwards the process to step 924. On the other hand, in response to the determination that a to-be-modified item field name is not written in the left region, the identification means 203 forwards the process to step 927 for outputting an error.

At step 924, the identification means 203 uses the entry information detection means 211 and the OCR means/position information detection means 212 to convert the to-be-modified item field name into text. The identification means 203 determines whether or not an item field name corresponding to the to-be-modified item field name exists in a predetermined field. The determination can be made by referring to the table 402 illustrated in FIG. 4B. In response to the determination that an item field name corresponding to the to-be-modified item field name exists in the predetermined field, the identification means 203 forwards the process to step 925. On the other hand, in response to the determination that an item field name corresponding to the to-be-modified item field name exist in the predetermined field, the identification means 203 forwards the process to step 927 for outputting an error.

At step 925, the identification means 203 uses the entry information detection means 211 and the OCR means/position information detection means 212 to detect an input value entered in the right region and converts the input value into text.

At step 926, the replacement means 205 replaces the attribute value of the to-be-modified item field in the table stored in the memory or the storage device with the value input in the right region.

At step 927, in response to the determination at step 923 that a to-be-modified item field name is not written in the left region, or in response to the determination that an item field name corresponding to the to-be-modified item field name exists in the predetermined field, an error indicating that the medication cannot be made is output. The output of the error can be notified to the user by a message displayed on a display connected to the apparatus 101 or a display provided on the intermediary means 231, or by a sound from a speaker provided in the apparatus 101 or in the intermediary means 231, or a vibration facility provided in the digital pen 241.

At step 928, the apparatus 101 ends the process for modifying information using the to-be-modified item field name and the modification field. Upon the end of the process, the apparatus 101 can forward the process to step 702 of FIG. 7A and wait until the next entry is detected.

Not only such a computer program itself but also a recording medium on which the computer program is recorded falls within the scope of the present embodiment. The computer program for executing functions of the present embodiment can be stored on any computer-readable recording medium such as a flexible disk, MO, CD-ROM, DVD, hard disk device, USB memory, ROM, MRAM, and RAM. The computer program can be downloaded from another data processing system connected through a communication link or duplicated from another recording medium for storing on a recording medium. Furthermore, the program can be compressed or divided into parts and then stored on a single or multiple storage media. It should be noted that a computer program product that implements the present embodiment in various modes can also be provided, of course. The computer program product may include, for example, a storage medium storing the computer program or a transmission medium that transmits the computer program.

It should be noted that the summary of the embodiment described above is not intended to enumerate all of the essential features of the present embodiment and combination or sub-combination of any of the elements can also constitute the present embodiment.

Various modifications can readily occur to those skilled in the art, such as combining hardware components of a computer used in embodiments of the present embodiment with a plurality of machines and allocating functions to them to implement the present embodiment. Such modifications are the conception encompassed in the idea of the resent embodiment, of course. However, the components are illustrative and not all the components are essential to the present embodiment.

The present embodiment can be implemented by hardware, software or a combination of hardware and software. A typical example of implementation by a combination of hardware and software is an implementation by an apparatus in which the computer program described above is installed. In that case, the computer program is loaded onto a memory of the apparatus and executed to control the apparatus to cause the apparatus to execute processes according to the present embodiment. The computer program may be made up of a set of instructions that can be represented in any language, code, or notation. Such a set of instructions enables the apparatus to execute a particular function directly or after (1) the set of instructions is converted to another language, code or notation and/or (2) copied to another medium.

The present embodiment enables a user to make modifications on a hand writable physical medium with a digital pen and therefore does not need another device such as a keyboard. Accordingly, the present embodiment excels in usability. Furthermore, the modification method according to the present embodiment can use any hand writable physical medium, for example any paper medium. Thus, the present embodiment can use various types of hand writable physical media and therefore excels in versatility.

The invention claimed is:

1. A method comprising:
    modifying information stored in storage by modifying information on a hand writable physical medium with a digital pen, wherein the hand writable physical medium comprises a predetermined field including one or more item field name and one or more first region for information entry associated with the one or more item field name, and the information stored in the storage includes attribute values corresponding to each of the one or more item field name of the physical medium, and attribute values corresponding to information entered into each of the one or more first region, the modifying comprising:

detecting, by an apparatus communicable with the digital pen, that a modification symbol is added, by using the digital pen, to information which has been entered into any of the one or more first region in the predetermined field;

identifying, based on detecting that the modification symbol is added, a pertinent item field name among the one or more item field names, wherein the pertinent item field name is associated with the one or more first region into which information to be modified is entered, based on position information of the digital pen when the modification symbol is added;

detecting, by the apparatus communicable with the digital pen, that information is entered into a second region for information entry by using the digital pen, the second region being different from the one or more first region associated with the identified item field name;

determining that the information entered into the second region includes information associated with the pertinent item field name; and replacing, based on the determining and the detecting that the information is entered into the second region, an attribute value in the storage medium corresponding to the information that has been entered into the one or more first region and associated with the pertinent item field name, with an attribute value corresponding to the information that has been entered into the second region.

2. The method according to claim 1,
wherein the physical medium further includes a modification field including one or more modification field name and a third region for information entry associated with the one or more modification field name;

the method further comprises: detecting, by the apparatus communicable with the digital pen, that any of the one or more modification field name is entered in the predetermined field by using the digital pen; and wherein replacing the attribute value further comprises replacing in the information stored in the storage an attribute value corresponding to the information entered in the one or more first region with an attribute value corresponding to the information entered in the third region, the replacing in response to detecting that information is entered in a third region associated with the modification field name entered in the predetermined field.

3. The method according to claim 1,
wherein the physical medium further includes a modification field including one or more modification field names; and the method further comprises:
detecting, by the apparatus communicable with the digital pen, that a modification field name is entered in the modification field by using the digital pen; and
detecting that a fourth region for information entry in the modification field is drawn adjacent to or near a region where the modification field name entered in the predetermined field has been entered; and
wherein replacing the attribute value further comprises replacing, based on detecting that information is entered in the detected fourth region, in the information in the storage an attribute value corresponding to the information entered in the one or more first region with an attribute value corresponding to the information entered in the fourth region.

4. The method according to claim 1, further comprising:
detecting that a fifth region for information entry is drawn on the physical medium by using the digital pen; and
associating the first region to which the modification symbol has been added with the fifth region by a line drawn by using the digital pen, wherein replacing the attribute value further comprises replacing, in response to detecting that information is entered in the fifth region, in the information in the storage, an attribute value corresponding to information entered in the one or more first region with an attribute value corresponding to information entered in the fifth region.

5. The method according to claim 4, further comprising replacing information indicating the position of the one or more first region on the physical medium with information indicating the position of the fifth region on the physical medium, in response to associating the first region to which the modification symbol has been added with the fifth region by a line.

6. The method according to claim 1, further comprising detecting that a to-be-modified item field name corresponding to an item field name for the first region to which the modification symbol has been added and a sixth region for information entry associated with the corresponding to-be-modified item field name are entered on the physical medium by using the digital pen, wherein replacing further comprises replacing, in response to detecting that information is entered in the sixth region, in the information in the storage, an attribute value corresponding to the information entered in the one or more first region with an attribute value corresponding to the information entered in the sixth region.

7. The method according to claim 1, further comprising detecting that information has been recorded the one or more first region in the predetermined field.

8. The method according to claim 7, further comprising identifying, in response to that information is recorded in the first region, an item field name that is associated with the one or more first region into which the information recorded is entered, on a basis of position information of the digital pen when the information is recorded in the first region.

9. The method according to claim 8, further comprising:
converting the recorded information into text data by using OCR (optical character recognition), in response to detecting that information is recorded in the one or more first region; and
setting the text data as an attribute value corresponding to the identified item field name in the information in the storage.

10. The method according to claim 9, further comprising:
determining whether or not the attribute value converted into the text data is appropriate for an attribute value corresponding to the identified item field name; and
notifying the user that the attribute value is not appropriate based on the attribute value converted to the text data being not appropriate.

11. The method according to claim 10, wherein notifying the user comprises one selected from the group consisting of:
notifying by vibrating the digital pen, the apparatus communicable with the digital pen, or an intermediary device intermediating between the digital pen and the apparatus communicable with the digital pen;

notifying by an audible message from the digital pen, the apparatus communicable with the digital pen or the intermediary device; and notifying by displaying on a liquid-crystal display attached to the digital pen, the intermediary device or the apparatus communicable with the digital pen.

12. The method according to claim 1, wherein the digital pen or the apparatus communicable with the digital pen is configured to acquire information indicating the position of the digital pen on the physical medium; and wherein identifying further comprises identifying an item field in which the information has been modified, in response to detecting that the modification symbols is added.

13. The method according to claim 1, wherein:

the digital pen or the apparatus communicable with the digital pen is configured to use optical character recognition (OCR); and the entered information is read by using OCR.

14. The method according to claim 1, wherein the attribute value corresponding to information entered in the second region is text data converted from the information entered in the second region.

15. An apparatus for modifying information stored in storage by modifying information on a hand writable physical medium with a digital pen, wherein the physical medium has a predetermined field including one or more item field names and one or more first region for information entry associated with the one or more item field name, and the information stored in the storage can have attribute values corresponding to each of the one or more item field name of the physical medium, and attribute values corresponding to information entered into each of the one or more first region, the apparatus comprising:

an apparatus communicable with the digital pen configured for detecting that a modification symbol is added, by using the digital pen, to information which has been entered into the one or more first region in the predetermined field;

an identification unit configured for identifying, in response to detecting that the modification symbol is added, a pertinent item field name among the one or more item field name, which is associated with the one or more first region into which information to be modified is entered, based on position information of the digital pen when the modification symbol is added, wherein the apparatus communicable with the digital pen is further configured for detecting that information is entered into a second region for information entry by using the digital pen, the second region being different from the one or more first region associated with the pertinent item field name, and a replacement unit configured for determining that the information entered into the second region includes information associated with the pertinent item field name, and for replacing, in response to the determining and the detecting that the information is entered into the second region, an attribute value in the storage medium corresponding to the information that has been entered into the one or more first region and associated with the pertinent item field name, with an attribute value corresponding to the information that has been entered into the second region.

16. The apparatus according to claim 15, wherein:

the physical medium further includes a modification field including one or more modification field names and a third region for information entry associated with the one or more modification field names;

the apparatus communicable with the digital pen is further configured for detecting that the one or more modification field name is entered in the predetermined field by using the digital pen; and the replacement unit is further configured for replacing, in the information in the storage, an attribute value corresponding to the information entered in the one or more first region with an attribute value corresponding to the information entered in the third region, the replacing in the information in response to detecting that information is entered in the third region associated with the one or more modification field name entered in the predetermined field.

17. The apparatus according to claim 15, wherein:

the physical medium further includes a modification field including one or more modification field names;

the apparatus communicable with the digital pen is further configured for detecting that the modification field name is entered in the predetermined field by using the digital pen and detects that in the modification field a fourth region for information entry is drawn near a region where the modification field name entered in the predetermined field has been entered; and the replacement unit is further configured for replacing, in the information in the storage, an attribute value corresponding to the information entered in the one or more first region with an attribute value corresponding to the information entered in the detected fourth region, the replacing in the information in response to detecting that information is entered in the detected fourth region.

18. The apparatus according to claim 15, wherein:

the apparatus communicable with the digital pen is further configured for detecting that a fifth region for information entry is drawn on the physical medium by using the digital pen and detects that the one or more first region to which the modification symbol is added is associated with the fifth region by a line drawn by using the digital pen; and the replacement unit is further configured for replacing, in the information in the storage, an attribute value corresponding to the information entered in the one or more first region with an attribute value corresponding to the information entered in the fifth region, the replacing in the information in response to detecting that information is entered in the fifth region.

19. The apparatus according to claim 18, wherein, in response to associating the one or more first region to which the modification symbol is added with the fifth region by the line, the identification unit is further configured for replacing information indicating a position, on the physical medium, of the one or more first region associated by the line with information indicating a position of the fifth region on the physical medium.

20. The apparatus according to claim 15, wherein:

the apparatus communicable with the digital pen is further configured for detecting that a to-be-modified item field name corresponding to an item field name for the one or more first region to which the modification symbol has been added and a sixth region for information entry associated with the corresponding to-be-modified item field name are entered on the physical medium by using the digital pen, and wherein the replacement unit is further configured for replacing in the information in the storage an attribute value corresponding to the information entered in the one or more first region with an attribute value corresponding to the information entered in the sixth region, the replacing in the information in response to detecting that information is entered in the sixth region.

21. A computer program product comprising: a non-transitory storage medium readable by a processing circuit and storing instructions for execution by the processing circuit for performing a method comprising:

modifying information stored in storage by modifying information on a hand writable physical medium by using a digital pen, wherein the physical medium has a predetermined field including one or more item field names and one or more first regions for information entry associated with the one or more item field names, and the information stored in the storage can have attribute values corresponding to each of the one or more item field names of the physical medium, and attribute values corresponding to information entered into each of the one or more first region, the modifying comprising:

detecting, by an apparatus communicable with the digital pen, that a modification symbol is added, by using the digital pen, to information which has been entered into any of the one or more first region in the predetermined field;

identifying, based on detecting that the modification symbol is added, a pertinent item field name among the one or more item field names, wherein the pertinent item field name is associated with the one or more first region into which information to be modified is entered, based on position information of the digital pen when the modification symbol is added;

detecting, by the apparatus communicable with the digital pen, that information is entered into a second region for information entry by using the digital pen, the second region being different from the one or more first region associated with the identified item field name;

determining that the information entered into the second region includes information associated with the pertinent item field name; and replacing, based on the determining and the detecting that the information is entered into the second region, an attribute value in the storage medium corresponding to the information that has been entered into the one or more first region and associated with the pertinent item field name, with an attribute value corresponding to the information that has been entered into the second region.

* * * * *